United States Patent [19]

Hayashi et al.

[11] Patent Number: 5,873,088
[45] Date of Patent: Feb. 16, 1999

[54] DERIVED DATA BASE PROCESSING SYSTEM ENABLING ONE PROGRAM TO ACCESS A PLURALITY OF DATA BASIS

[75] Inventors: Katsumi Hayashi, Mishima; Kazuhiko Saitou, Numazu; Hiroshi Ohsato, Numazu; Masaaki Mitani, Numazu; Tomohiro Hayashi, Mishima; Takashi Obata, Mishima; Yutaka Sekine, Numazu; Mitsuhiro Ura, Suntou-gun; Takuji Ishii, Numazu, all of Japan

[73] Assignee: Fujitsu Limited, Kawasaki, Japan

[21] Appl. No.: 343,879

[22] Filed: Nov. 17, 1994

Related U.S. Application Data

[63] Continuation of Ser. No. 745,244, Aug. 14, 1991, abandoned.

[30] Foreign Application Priority Data

Aug. 31, 1990 [JP] Japan ................................ 2-231449
Aug. 31, 1990 [JP] Japan ................................ 2-231451

[51] Int. Cl.$^6$ ........................................... G06F 17/30
[52] U.S. Cl. ...................... 707/100; 707/102; 345/339; 345/329
[58] Field of Search ........................... 395/600, 500, 395/700, 200.02, 200.03, 601–612; 345/339, 329; 707/100, 102

[56] References Cited

U.S. PATENT DOCUMENTS

| | | | |
|---|---|---|---|
| 4,714,995 | 12/1987 | Materna et al. | 395/600 |
| 4,774,655 | 9/1988 | Kollin et al. | 395/600 |
| 4,774,661 | 9/1988 | Kumpati | 395/600 |
| 4,833,597 | 5/1989 | Wakayama et al. | 395/600 |
| 4,908,759 | 3/1990 | Alexander, Jr. et al. | 395/600 |
| 5,058,000 | 10/1991 | Cox et al. | 395/600 |
| 5,201,046 | 4/1993 | Goldberg et al. | 395/600 |
| 5,257,366 | 10/1993 | Adair et al. | 395/600 |
| 5,274,806 | 12/1993 | Hill | 395/600 |
| 5,278,978 | 1/1994 | Demers et al. | 395/600 |
| 5,369,761 | 11/1994 | Conley et al. | 395/600 |
| 5,375,237 | 12/1994 | Tanaka et al. | 395/650 |
| 5,416,917 | 5/1995 | Adair et al. | 395/500 |
| 5,448,726 | 9/1995 | Cramsie et al. | 395/600 |

OTHER PUBLICATIONS

"EDICT—An Enhanced Relational Data Dictionary: Architecture and Example", Davis et al., Data Engineering, 1988 4th International Conference, IEEE. Jun. 1988.

"DATAPLEX: An Access to Heterogeneous Dustributed Databases", Ching–Wam Chung, Communications of the ACM, v33, n1, p70(11), Jan. 1990.

*Primary Examiner*—Thomas G. Black
*Assistant Examiner*—Hosain T. Alam
*Attorney, Agent, or Firm*—Staas & Halsey

[57] ABSTRACT

A derived database processing system in a database processing device comprises a plurality of independent databases which can provide a plurality of users with a group of data to be shared for a common purpose. The derived database processing system comprises a dictionary for managing database logical definition information and database storage information in a secondary memory, a derived database registering unit for determining a definition frame of a new name without violating a definition frame of a name used in a schema definition which defines data in a database, a dictionary information manipulating means for referring to said dictionary when the manipulation target is a derived database, then selecting necessary components of said database, and a database processing procedure generating unit, in a binding process to optimize access routing in a database.

7 Claims, 34 Drawing Sheets

FIG. 4

SALE DATABASE GROUP
- SAPPORO CIRCULATION CENTER DATABASE
- TOKYO CIRCULATION CENTER DATABASE
- NAGOYA CIRCULATION CENTER DATABASE
- OSAKA CIRCULATION CENTER DATABASE
- FUKUOKA CIRCULATION CENTER DATABASE

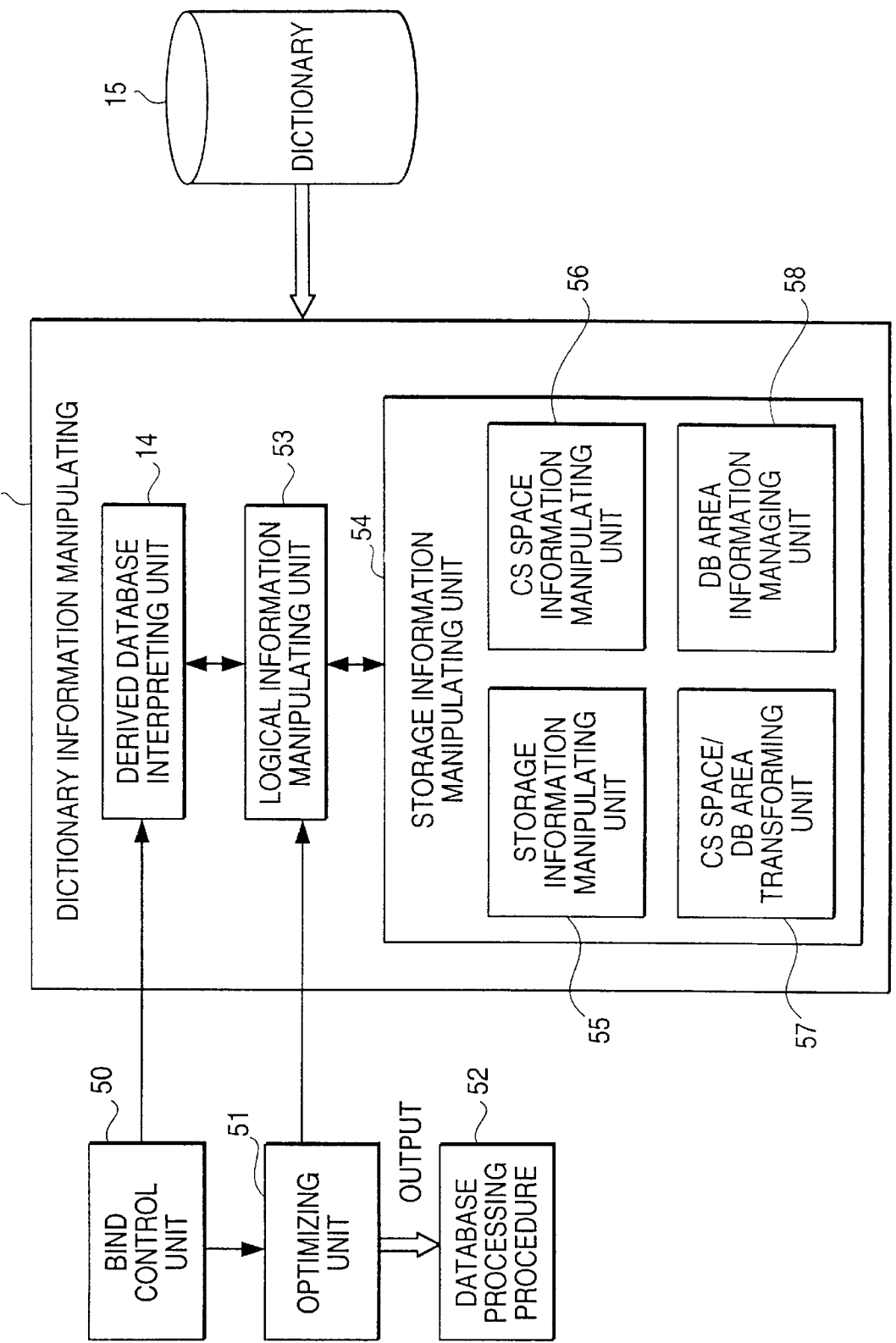

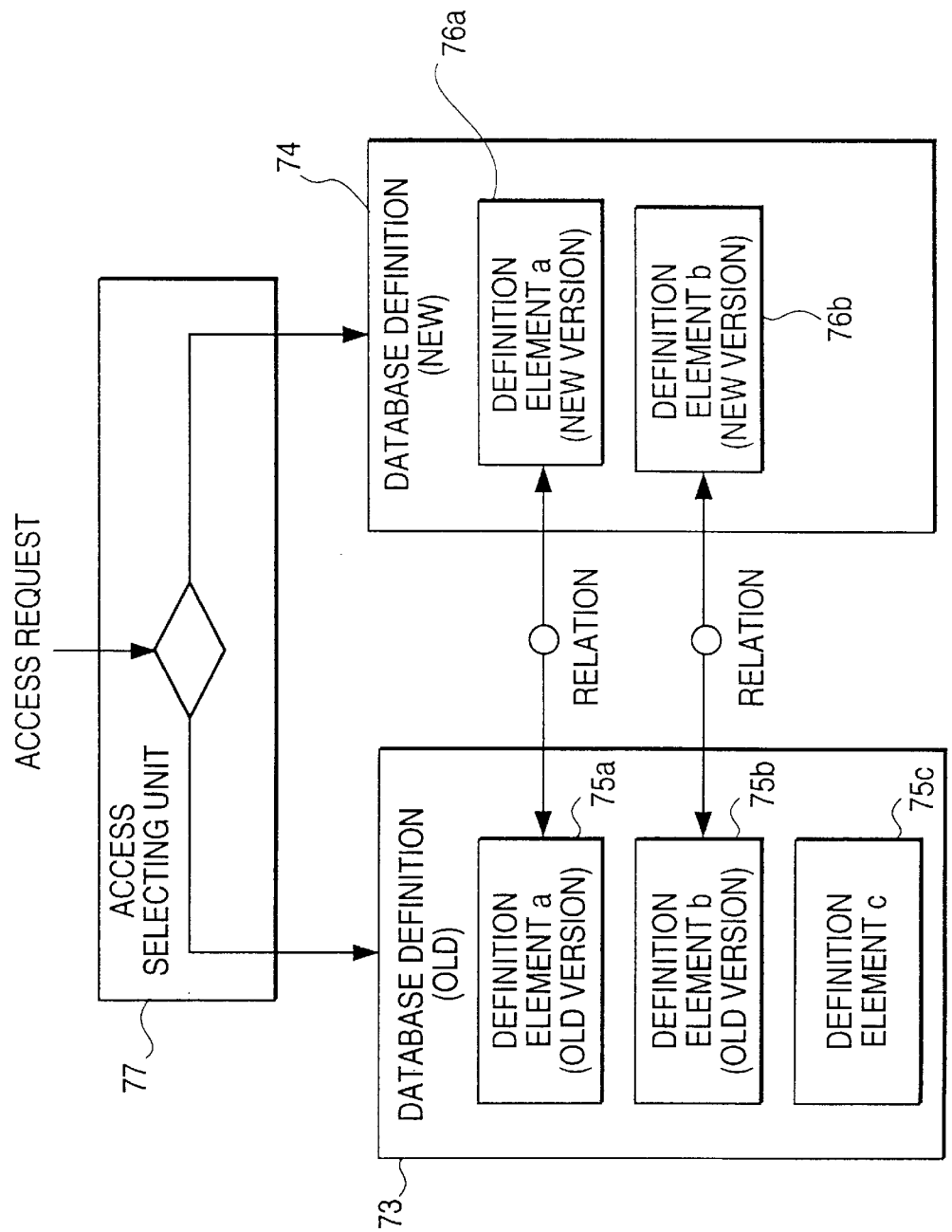

DERIVED DATA BASE PROCESSING SYSTEM ENABLING ONE PROGRAM TO ACCESS A PLURALITY OF DATA BASIS

This application is a continuation of application Ser. No. 07/745,244, filed Aug. 14, 1991, now abandoned.

BACKGROUND OF THE INVENTION

1. Field of the Invention

The present invention relates to a derived database processing system in a database processing device, and more particularly, to a derived database processing system including a plurality of independent databases which can provide a plurality of users with a group of data to be shared for a common purpose.

2. Description of the Related Art

As demand for a high performance database management system rises, an efficient technology realizing an extensive and flexible processing system for a database is required.

For example, in the standard of an SQL (Structured Query Language) language which is as a computer language for a database (for example, a database language SQL JISX3005-1990), defines a database as a collection of all data defined by a plurality of schemata in a single environment. Therefore, one application program accesses one database.

However, in the actual application (environment) of a database, a conventional concept of a database according to such an SQL standard has many difficulties. That is, diversified processes covering a plurality of databases are required as follows:

① a process among independently developed databases;
② a process among a division database and a central database;
③ a process among databases having the same schema structure but operated independently;
④ a process among a private database and a shared database;
⑤ a process between test data and a production database.

Therefore the term "database" and its plural is used herein to enable the discussion of the diversified processes mentioned above.

Ordinarily, in the process where a plurality of databases are accessed, countermeasures are taken properly according to each situation.

For example, when a plurality of divisional databases, each developed independently, are accessed ordinarily, they are accessed according to the following methods:

The first method is to integrate defined schemata to rebuild them into one database through which application programs can share data therein.

The second method is to make independent division databases from defined schemata. An application program is generated for each division, and the communication of application programs among a plurality of databases is performed by the transmission of data through common files.

The above described actions burden processes such as rebuilding a database and developing an application program.

That is, an object of a database is to share data, eliminate redundant data, and clear the semantic inconsistency among data. Generating a database from defined schemata maybe one way to accomplish this object. However, the fact is that a database must be developed in a divisional manner for each independent job of a division, development term, and scale of development. Accordingly, generating a single database from all data often proves to be an unreasonable job.

In the prior art technology, an application program can access only one database. Being unable to access a plurality databases, the application program has the following problems:

① Among independently developed databases, such processes as a cross-reference of a table among databases, transmission of data, or update of data cannot be performed simultaneously by the same application program.
② Between a divisional database and a central database adjustment of data is difficult, and it is very difficult to make adjustment among all divisional databases.
③ Among independently developed databases having the same schema structure, one application program cannot access data which is distributed to a plurality of databases and stored in tables having the same definition.
④ Between a private database and a shared database, data cannot be accessed simultaneously by one application program, which causes undesirable influence on the operation.
⑤ Between test data and a production database, a test cannot be conducted using a production database with test data intermixed with a production database.

Additionally, if a plurality of databases are used practically, names must not be duplicated among those databases. Therefore, care must be taken with respect to names in other databases, thus proscribing independent development of each database.

Defining a database means interpreting the database. The data in the database are stored in the format consistent with the interpretation based on the definition. An application program for accessing a database accesses data according to the database definition information. Thus, a definition of a database, data in a database, and an application program for accessing a database are associated with one another.

Therefore, modifying the definition of a database affects the data in a database and an application program for accessing the database. Therefore, the data in a database are frequently accessed and modified, while the definition of the database is not modified as frequently. However, to meet the requirements of manipulating a database, the modification of a database definition is inevitably required.

In this case, if a database management system provides a mechanism for supporting the modification of a definition according to a common definition modification model instead of an ordinary user-specified ad hoc method, a user's effort can be reduced when the definition is modified.

The usage of a database varies as time goes by. With the fluctuation of the amount of data stored in a database, a storage structure may be required to be modified. The change in the importance of a database and the frequency of access requests may require the modification of the storage structure.

A change in the real environment which reflects on the logical structure of the database may require the modification of the database itself. Simple examples are modification of a column attribute (an eight-digit column must be extended to a 10 digit column due to an increase in numerical and increase of columns (FAX numbers as well as phone numbers are required). Furthermore, addition or deletion of restrictions for table integrity, and division or integration of a table may be required.

At the time when definition modification in various aspects is required, a database may have much data stored therein and be used by a number of users through application programs, which may not have been envisioned in an initial design stage of the database. Therefore, it must be confirmed before actually performing definition modification that there will be little affect on the existing systems and related jobs. If the reorganization of stored data is required for the definition modification, a period when a database cannot be processed due to the re-organization must be made as short as possible.

In an ordinary database management system, the test of the state after definition modification cannot be performed effectively unless a test system is generated on the same scale as the existing system. Besides, as a database management system does not provide a mechanism for permitting modification for each definition element based on a common definition modification model, it is difficult to perform progressive modification. Therefore, a new system must be generated after the modification.

As described above, in the prior art technology, the relation among a definition of a database, data in a database, and an application program for accessing a database is not established clearly. Therefore, the definition modifying procedure of a database is left to a user, for example, a system operator who cannot use the formatted modification procedure.

For example, the main methods which a user may adopt for definition modification are described as follows:

The first method is to stop manipulating a database completely, rebuild the database including the definition modification, and restart the operation on the database. Regeneration of data and modification of an application program may also be required. As the operation in progress must be stopped in this method, an unstable definition state can be avoided, thus ensuring the integrity of data. However, the operation must be stopped for a long time, thus causing trouble for users.

The second method is to unconditionally permit definition modification if necessary even during the operation, and effectuate the definition immediately after the modification. Against the undesirable effects of the modification, a modification of the definition must take ad hoc action. That is, a system operator must reflect the modification without stopping the operation totally by localizing the influence of the modification after fully recognizing the nature of data associated with the definition to be modified.

In the second method described above, as modification must be made on the spot, the extent of an influence of the modification can be erroneously determined, and the state prior to the modification may not be easily restored when an error occurs.

SUMMARY OF THE INVENTION

An object of the present invention is to solve the above described problem, and provide a way to for easily realize a process where an access of an application program to a plurality of databases is performed as if it were an access to one database.

Another object of the present invention is to adjust the relationship among a database definition, data in the database, and an application program that accesses the database, and provide a standardized format of definition modification model and mechanism for realizing the model, thus shortening the time period of any halts to operation during modification of a definition, and facilitating a preliminary test of the result of the modification and a progressive modification of a definition as compared with the conventional modification of the definition which is performed by users.

A feature of the present invention resides in a derived database processing system in a database processing device comprising a plurality of independent databases which can provide a plurality of users with a group of data to be shared for a common purpose. The derived database processing system of the comprising: present invention comprises a dictionary for managing database logical definition information and database storage information in a secondary memory, a derived database registering unit for determining a definition frame of a new name without violating a definition frame of a name used in a schema definition which defines data in a database, and, for registering to said dictionary, database selection information corresponding to a derived database having semantic consistency among tables in said database, selection information relating to components of a selected database, and alias specification information for specifying an alias for a name used in said database, a dictionary information manipulating unit for referring to said dictionary when the manipulation target is a derived database, then selecting necessary components of said database, and replacing said alias, if any, with an original name, and a database processing procedure generating unit, in a binding process to optimize access routing in a database, for generating a database processing procedure using a partial collection of storage components of a plurality of databases provided by a derived database information registered in said dictionary, by which an application program to access a plurality of databases is enabled.

Another feature of the present invention resides in a database processing device for accessing a database according to database definition information. The database processing device of the present invention comprises a definition modification managing unit for managing each definition element of definition information of an old version of a database, definition information of a new version of said database as being undetermined, and the relation between said information, and an access selecting unit for selecting, in response to an access request, an access using definition information of an old version, or an access using definition information of a new version as being undetermined. In the present invention, during the modification process, the definition information of an old version of a database, the definition information of a new version of the database, and the relation between them can be managed, and the old version information is replaced with the new version information by a mechanism provided in a database management system.

BRIEF EXPLANATION OF THE DRAWINGS

FIG. 4 shows an example of databases having the same schema structure but processed independently;

FIG. 9A is a configuration example of a database manipulating system applied with an embodiment of the present invention;

FIGS. 15A and 15B show an explanatory view of an access selecting unit applied in an embodiment of the present invention;

DETAILED DESCRIPTION OF THE PREFERRED EMBODIMENT

Figure 1:
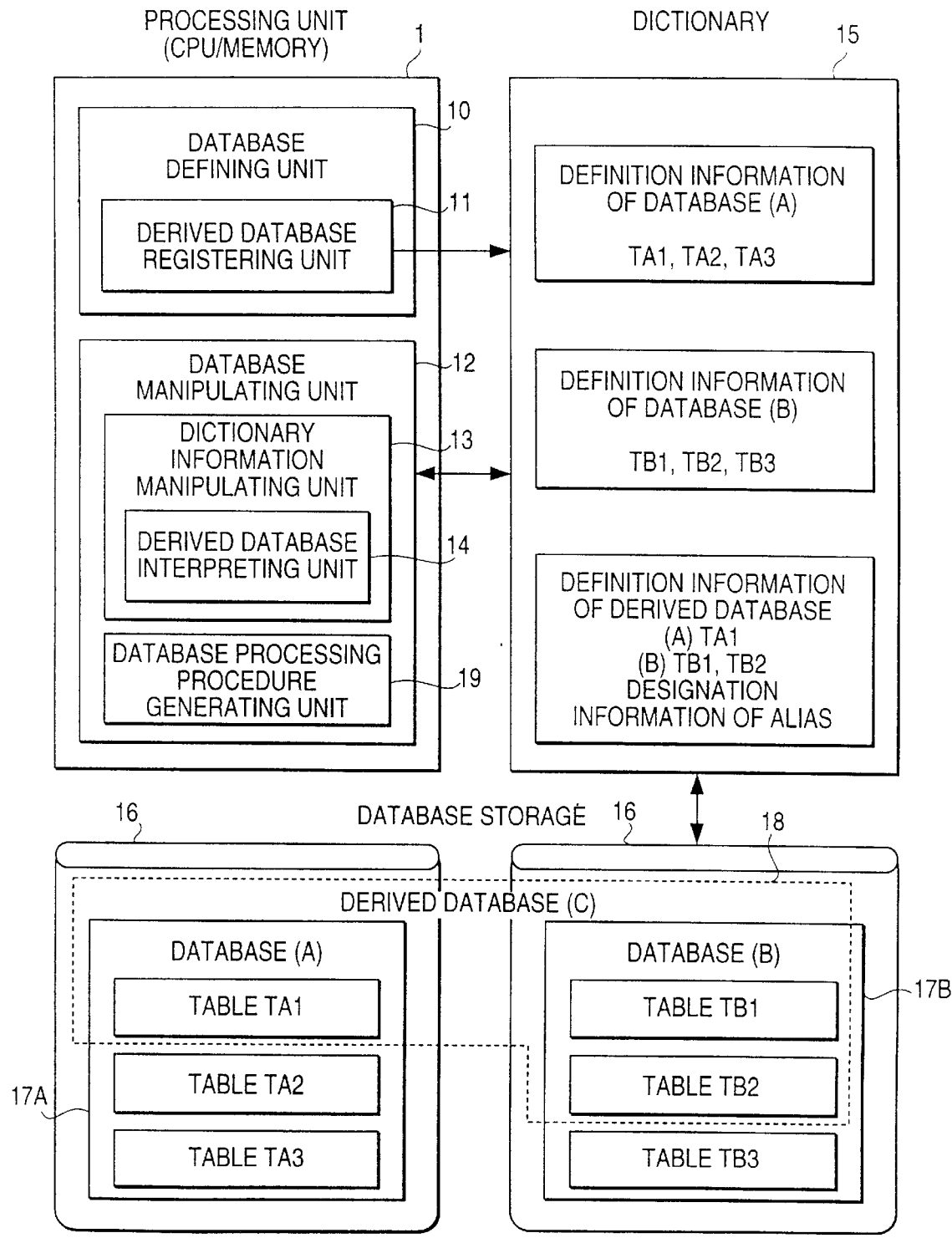
FIG. 1 is an explanatory view of the principle of an embodiment of the present invention.

FIG. 1 is an explanatory view of the principle of the present invention.

In FIG. 1, 1 shows a processing unit comprising a CPU, memory, etc.; 10 shows a database defining unit for interpreting and registering a database define statement; 11 shows a derived database registering unit; 12 shows a database manipulating unit for processing access requests, etc. to a database; 13 shows a dictionary information manipulating unit; 14 shows a derived database interpreting unit; 15 shows a dictionary for storing definition information of a database and a derived database; 16 shows a database storage; 17A and 17B show databases; 18 shows a derived database; and 19 shows a database processing procedure generating unit.

Data bases 17A and 17B are independent databases. In the present invention, a partial collection of components of these databases can be defined as a derived database 18.

A derived database 18 has been developed according to a new naming concept "a derived database" where names are assigned without, according to the interpretation of names with a syntax rule, violating the definition of names in a schema definition for defining data of a database. According to the interpretation in a semantic rule, a process of reference restrictions which is referred to in the schema definition associated with a selected table is prescribed.

A derived database registering unit 11 of a database defining unit 10 receives a define statement of such a derived database 18, and performs registration of the definition information to a dictionary 15.

The dictionary 15 is a storage for collectively managing the schema definition for generating a database and the information on the database storage in the secondary storage. The dictionary 15 itself can also be built as a database.

The definition information registered in the dictionary 15 comprises, for example, selection information of a database associated with a derived database 18, selection information relating to the components of selected database, and alias designation information for assigning an alias if necessary to a name used in the database.

When an access request is issued to databases 17A, 17B, or a derived database 18, a database manipulating unit 12 generates an access schedule for processing the access request.

When the derived database 18 is used, a dictionary information manipulating unit 13 refers to a dictionary 15, selects necessary logical and storage structure components among database definitions by a derived database interpreting unit 14, and replaces an alias, if designated, with its original name. In the binding process where the optimizing process for determining the access route to a database is performed, a database processing procedure generating unit 19 generates a database processing procedure for a partial collection of components of a plurality of databases according to the information of derived databases registered in the dictionary 15.

Thus, the derived database 18 is provided for an application program through the database processing procedure as if it were a real i.e. not-virtual database.

The present invention adopts, in a plurality of databases, the concept of a view of a database. with regard to the database, like a view of a table, in a relational database.

For example, suppose a database 17A comprises a tables TA1, TA2, and TA3 and a database 17B comprises tables TB1, TB2, and TB3.

When an application program accesses these tables TA1, TB1, and TB2 simultaneously in these databases, the definition of the derived database (C) 18 for designating a database 17A, database 17B, and their tables TA1, TB1, and TB2 is registered through a derived database registering unit 11. In this definition, a name in a table, etc. used for the derived database 18 is assigned a name which is different from its original name. Thus, even though a name in a table, etc. in the database 17A and a name in a table, etc. in the database 17B are duplicates, the conflict of same names can be avoided by assigning an alias to one name.

In a database manipulating unit 12, when the derived database 18 is used, the registered information in the dictionary 15 is transformed to access information such as a storage structure of components (data entities) associated with the derived database 18. Therefore, an application program views the derived database 18 as a real database, thus processing a plurality of databases 17A and 17B collectively.

To clarify the concept of a derived database in the present invention, an explanation follows where as an appropriate countermeasure, an integrated concept of "a derived database" is taken with a plurality of databases using practical examples of operation.

(1) Between independently developed databases

There is an operation with independently developed databases for each division. "Independently" means that designing a database, developing an application program, managing a database, and executing the program are all performed independently among divisions.

In such an independent operation, an access request may arise where a data access covers other divisions' databases.

In the prior art technology, defined schemata are integrated into one database to permit application programs to share data, or defined schemata are organized into independent divisional databases, with an application program prepared for each division, to transmit data through common files.

By contrast, using a derived database, the following approach is adopted:

i) As databases are designed independently among independent divisions, modification of names is very difficult even though a plurality of schemata and tables have the same name. In a derived database, the conflict of same names can be avoided by assigning a new name through the definition of the derived database.

ii) There are a lot of access requests where only particular tables are requested to be accessed. In response to such requests, using a derived database, the necessary tables are selected from a plurality of databases.

Figure 2:
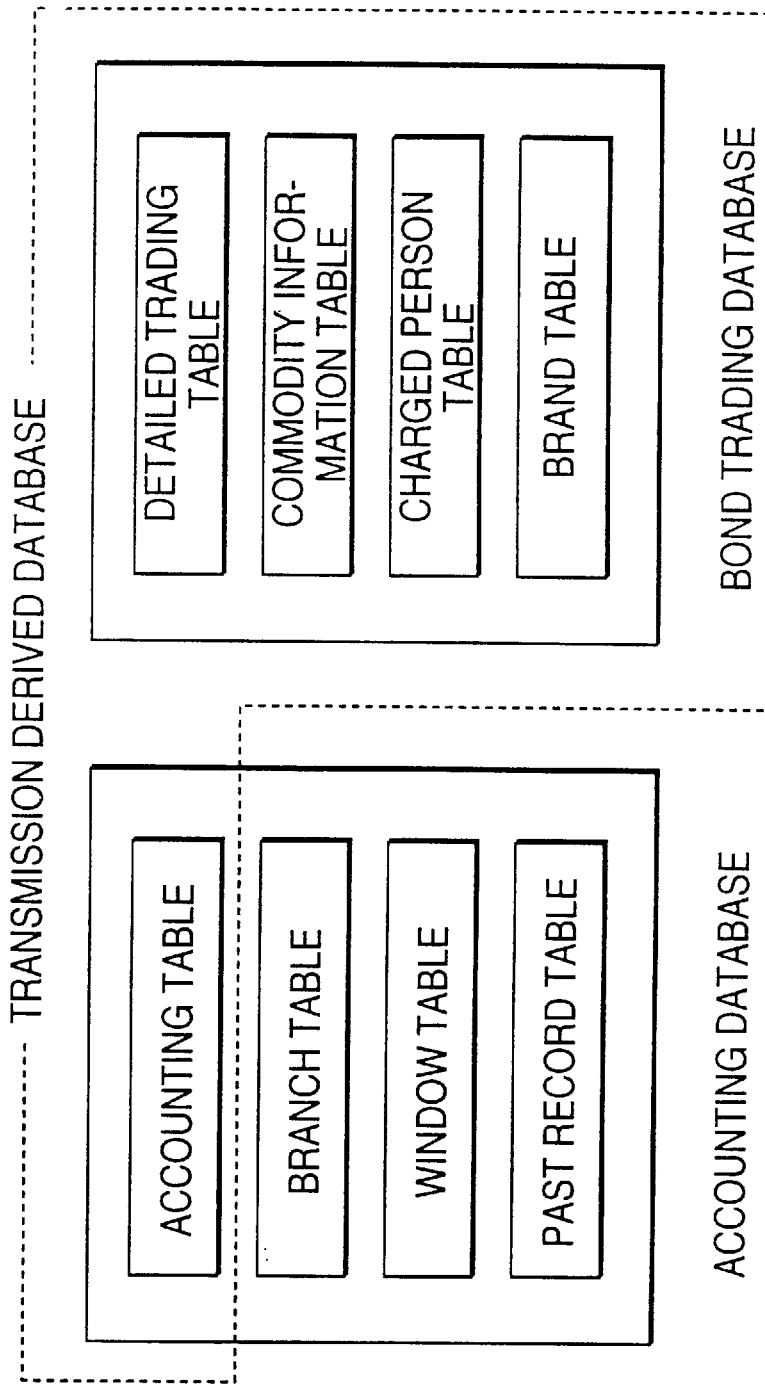
FIG. 2 is a definition example of a derived database applied with the present invention.

FIG. 2 shows definition examples of independently developed databases and a derived database.

In banking, jobs comprising accounting and bond trading divisions are often operated with two databases. In this case, however, a bond trading application program sometimes must refer to the balance in an account table in an accounting database, or must update an accounting table using the contents of a detail trading table in a bond trading database.

In this embodiment, a transmission derived database is defined using an accounting table in an accounting database and a detailed trading table in a bond trading database. With this derived database, an application program is permitted to access a plurality of databases.

(2) Between a division database and a central database

There is an operation where a database of each division in addition to a central database is provided independently. A central database is a database managed collectively. A divisional database is a local database, larger in total number than a central database, and managed locally in each division.

With these databases, there is an access request to both a divisional and central database simultaneously. A simultaneous access is performed in three ways: (1) read data from a central database to a divisional database, edit, and process the data, (2) store data in a divisional database into a central database, or (3) manipulate a plurality of databases among divisions.

Using a derived database, a simultaneous access between a central database and a divisional database is performed as in the (1) described above. Especially when divisional databases are manipulated simultaneously, avoiding the conflict of same names is difficult because of the independent organization of divisions.

Figure 3:
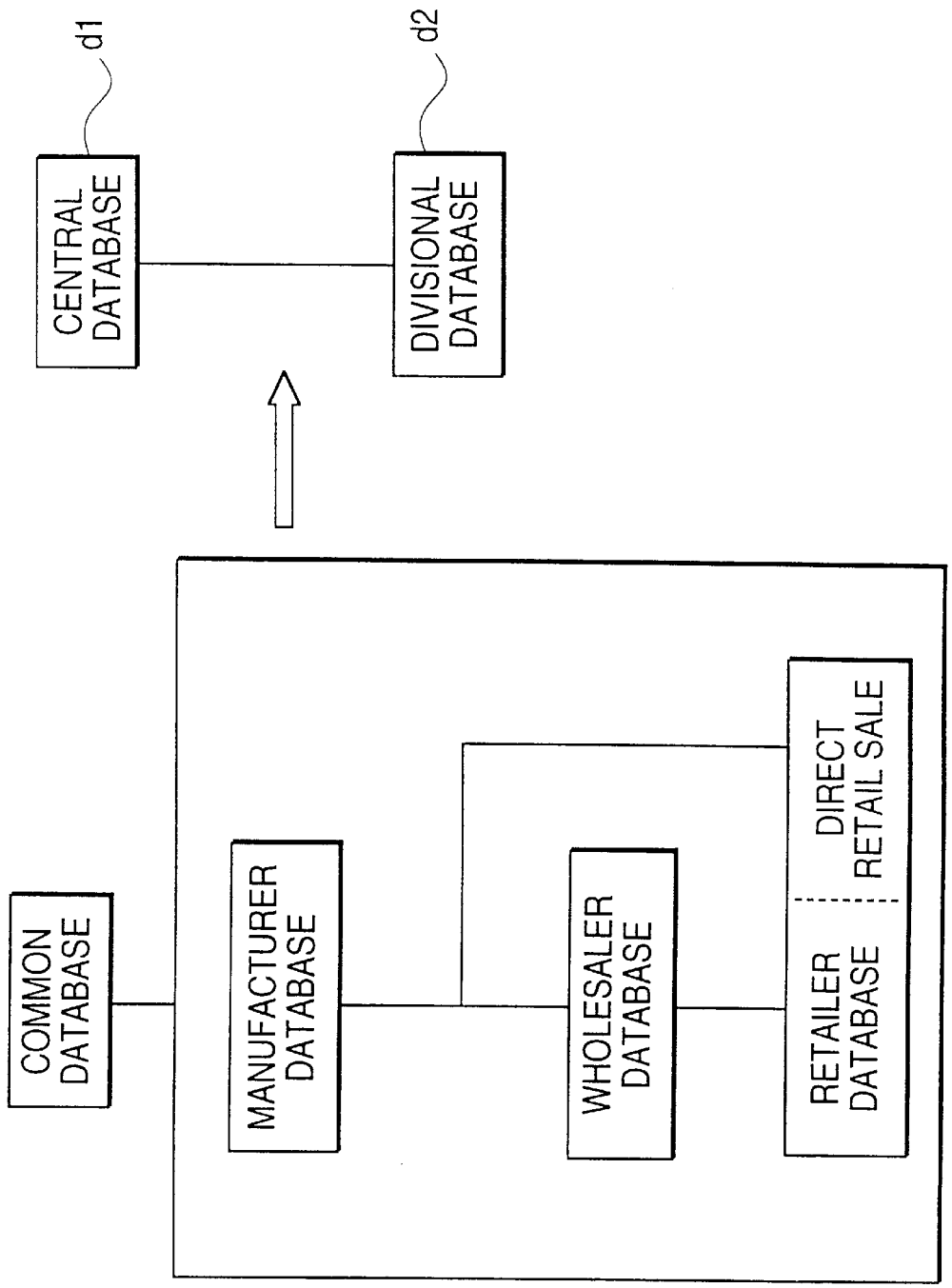
FIG. 3 shows an example of a divisional database and a central database.

FIG. 3 shows an example of a divisional database and a central database.

For example, with respect to wholesale business, the outline of the logical structure of whole sale business data comprising common data, manufacturer data, wholesaler data, and retailer data are associated with a central database d1 and a divisional database d2, as shown in FIG. 3. Suppose common data, manufacturer data, wholesaler data, and retailer data are stored in respective databases. In that case, the relation between the central and divisional databases corresponds to the relation between the common and manufacturer, common and wholesaler, and common and retailer respectively. Among divisions, the corresponding relation lies in the manufacturer and wholesaler, and wholesaler and retailer.

The information relating to other databases in a database schema of common data is manufacture information, manufacturer product attribute information, wholesaler ledger, retailer ledger, and consumer information (survey of housekeeping books, population, and various statistics).

The information relating to other databases in a schema table definition of a manufacturer database is the manufacturer's sales amount and a budget plan.

The information relating to other databases in a schema table definition of a wholesaler database is the manufacturer's sales amount.

The information relating to other databases in a schema table of a retailer database is POS data and order data.

In relation to data sharing among divisional databases, a manufacturer division processes information about each commodity; a wholesaler division processes information about each commodity, manufacturer, and retailer; and a retailer division processes information about retailers.

For example, when a wholesaler division analyzes each commodity produced by related manufactures, as a commodity analysis derived database, manufacturer information and manufacturer commodity attribute information are selected from a central database; sales information and budget information from a manufacturer database; and sales information from a wholesaler database, thus defining a derived database.

Between a central and divisional databases, a manufacturer division, wholesaler division, and retailer division share data to obtain consumer information, commodity information, and various kinds of analytic information.

For example, when information is stored in a central database, a derived database is defined to refer to information in a divisional database. On the other hand, when analytic information is obtained from a divisional database, analytic information of a central database may be referred to.

(3) Between databases having the same schema structure but operated independently There can be operating manners in which the design of a database, the development of an application program, and the management of the database are performed collectively; and a database of each division is independently processed.

In these operating manners, however, data of the table having the same name is possibly collected where the application program accesses a plurality of databases.

In the prior art technology, an application program extracts data for each database independently, and then merges the data.

In the concept of a derived database, data are associated like in the example (1) described above. Therefore, individual processing on each of a plurality databases can be avoided.

FIG. 4 shows an example of databases having the same schema structure but processed independently.

Data bases of an enterprise having the same type of schema definition may be managed independently. In an example shown in FIG. 4, a sales database is manipulated for each district. Main information comprises sales information and customer information. Usually, a database is prepared and used for each district, but a plurality of databases must be accessed simultaneously when the sales of the whole enterprise are obtained. This can be easily attained by defining a derived database for tables and columns which need associated sales databases.

(4) Between a private database and a shared database

There are two types of examples of the relation between a private database and a shared database containing data necessary for private jobs. One is to read data from a shared database to a private database to edit and process them. The other is to refer to a shared database in order to process a private database. The latter refers to the same process as that described in (2).

Concerning such a case, in the prior art technology, data is read from a shared database to a private database where it is edited and processed, and then returned to the shared database.

In the derived database, a plurality of databases can be simultaneously accessed, thereby simplifying the process procedure.

Figure 5:
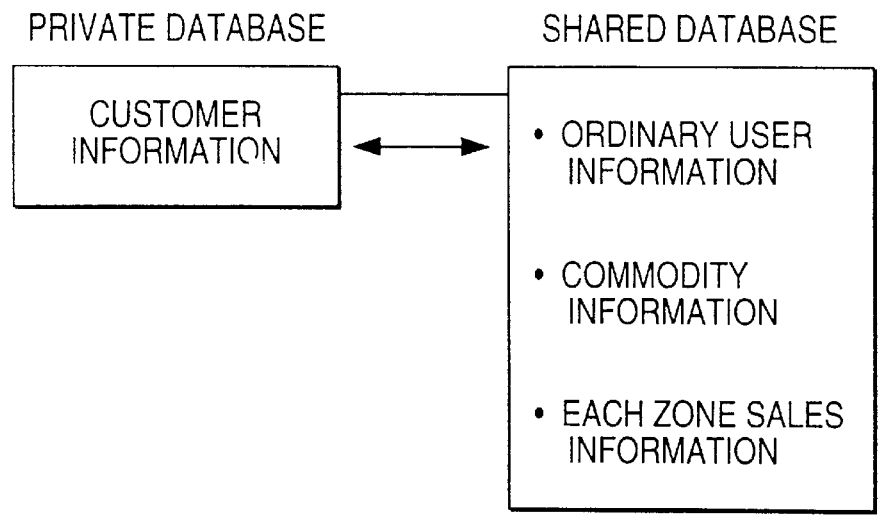
FIG. 5 shows an example of a private database and a shared database.

FIG. 5 shows an example of a private database and a shared database.

Customer information associated with private sales records is stored in a private database, and common customer information and commodity information are stored in a shared database. When referring to sales information for each district and reading new commodity information to a private database for preparing an estimate, and when reading private customer information in a private database to common customer information in a shared database, data must be transmitted between the private database and the shared database. The data transmission is easily performed using a derived database.

(5) In the test system where a test is conducted between a test database and a production database, a test may be conducted using both databases simultaneously when, for example, a new application program is developed during the execution of an online system.

In the prior art technology, two methods are used: (1) generate a test database on the same scale, requiring double resources at most, or (2) add a test table having an alias to a production database, test an application program under the alias, and rewrite the original name after the test.

With a derived database, a table updated by a tested program is prepared in a test database in addition to a production database, thus permitting simultaneous access to both databases without modifying an application program.

Figure 6:
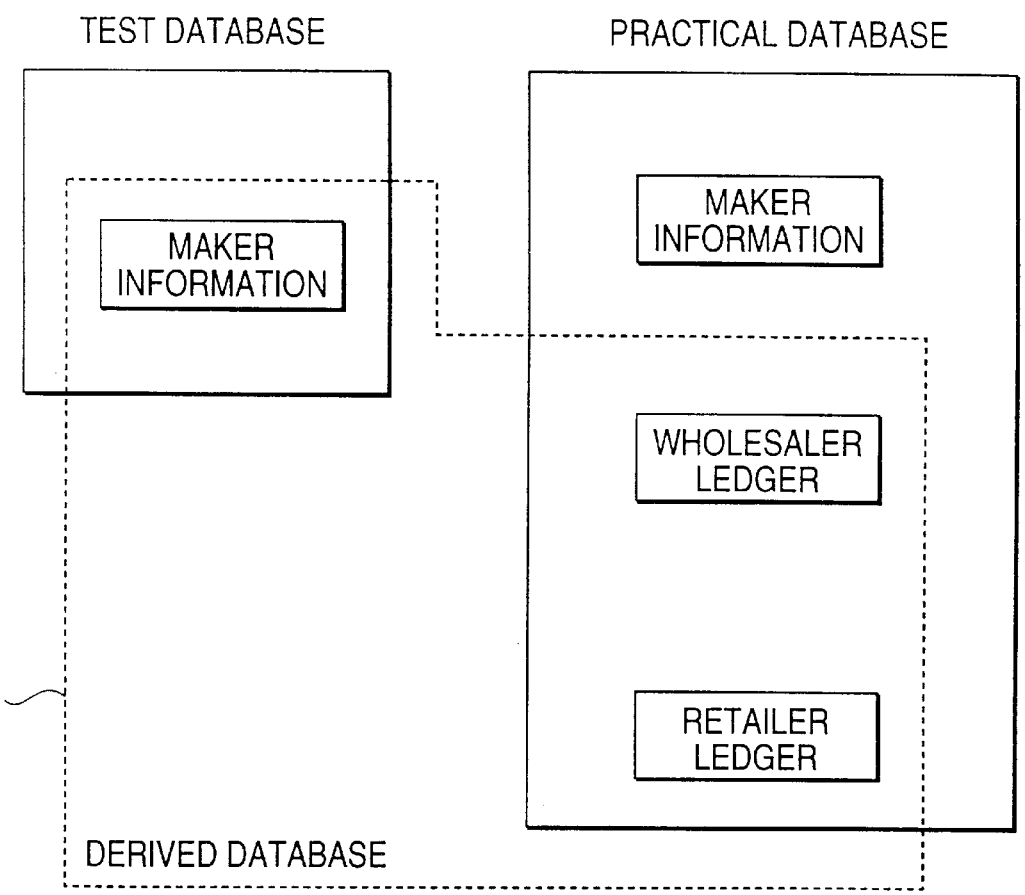
FIG. 6 shows an example of the test database.

FIG. 6 shows an example of the test database.

As shown in FIG. 6, if a test is conducted on new manufacturer information when a practical operation is performed using a production or practical database comprising manufacturer information, wholesaler ledger, retailer ledger, etc., and if the wholesaler ledger and the retailer ledger are used only for reference, the manufacturer information of the test database, the wholesaler ledger of the production database, and the retailer ledger are defined as a derived database 18 which is used for easily conducting a test on manufacturer information.

As described above, a derived database can be used for providing necessary services for various processes.

A derived database can be considered a view of a database on a database level similar to a view of a table on a table level.

Figure 7:
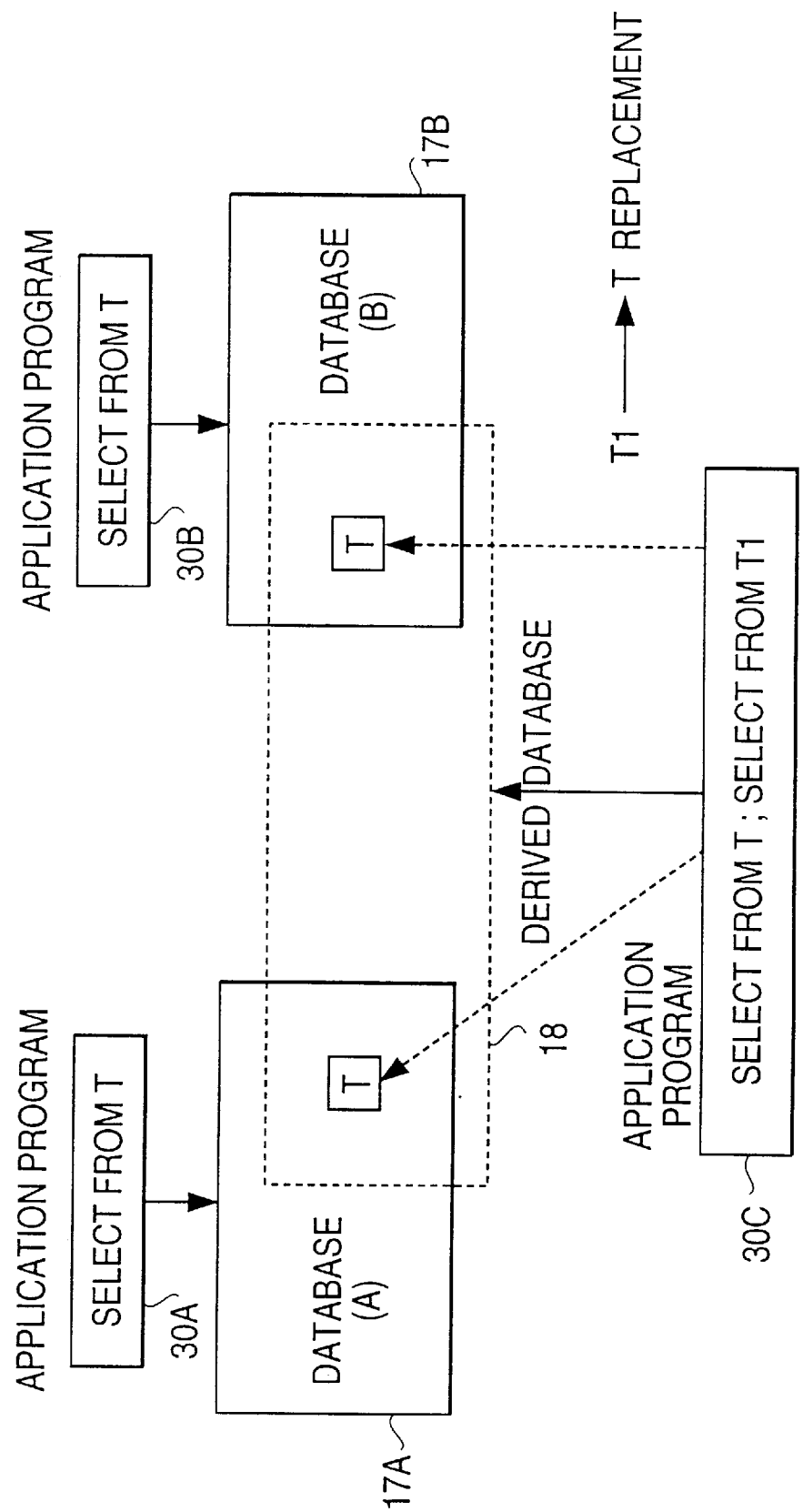
FIG. 7 is a view for explaining the function of a derived database applied with the present invention.

As shown in FIG. 7, in the prior art technology, an application program can access only one database at a time; for example, an application program 30A can access a database 17A, and an application program 30B access a database 17B.

With a derived database, an application program 30C, for example, accesses necessary parts of a plurality of databases 17A and 17B as a derived database 18.

When the same table name T exists in a plurality of databases, an alias such as T1 is assigned to identify the table name uniquely.

Figure 8:
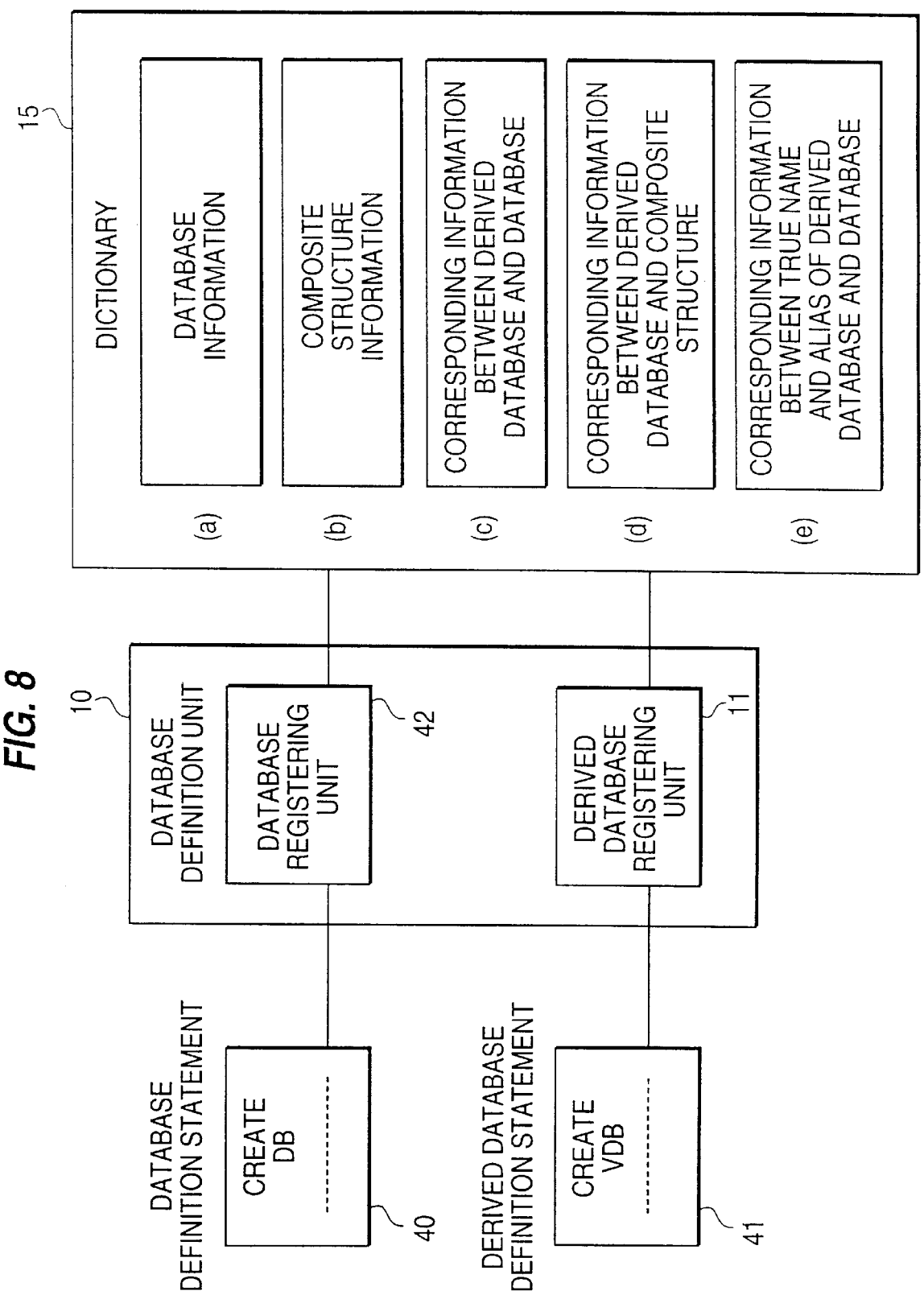
FIG. 8 is a view for explaining the registration of a derived database applied with an embodiment of the present invention.

FIG. 8 is a view for explaining the registration of a derived database applied with an embodiment of the present invention.

A database registering unit 42 in a database defining unit 10 interprets a normal database define statement 40, and registers the definition information in a dictionary 15. A derived database registering unit 11 interprets a derived database define statement 41, and registers the definition information in the dictionary 15.

The BNF format of the database define statement 40 and the derived database define statement 41 is described below. In the present embodiment example, a logical structure and a storage structure are separated and one unit of composite data in the logical structure expression (a table or a part of it) is stored in association with a management unit in a plurality of storages. For this purpose, a composite structure (which is called CS hereinafter) is used as a management unit which refers to a basic component of a database having an independent structure in physical media. A CS (Composite Structure) is a storage structure comprising a combination of basic data organizations such as a heap, B+tree, hash, etc., and can be associated with one table in one schema, and a plurality of tables or a specific column, etc. in a table. The present invention can be realized without the concept of a CS described above.

[Description format of a database define statement]

<database definition>::=CREATE DB <database name> [FROM <cs designation>]

<database name>::="identifier"

<cs designation>::=<cs name>[ , {<cs NAME>}. . . ]

[Syntax rule]

<database name> in the CS definition of each CS designated by <cs name> must match <database name> in <database definition>.

[Semantic Rule]

A database comprises CSs designated by <cs names> in <cs designation>. The database is named by <database name>. If <cs designation> is skipped, a CS designating the present <database name> in the database designation in the CS definition will be a component.

[Description format of a derived database define statement]

<definition of derived database>::=CREATE VDB <derived database name>
  FROM <element DB designation>[WHERE <replacement list>]
<derived database name>::=<identifier>
<element DB designation>::=<database name>[<cs list>]
  [{, <database name>[<cs list>] }. . . ]
<CS list>::=(<cs name>[{, <cs name>}. . . ])
<replacement list>::=<replacement list>[{, <replacement element>}. . . ])
<replacement element>::=<schema name 1> AS <schema name 2> ON <database name>
  |<table name 1> AS <table name 2> OA <database name>

[Syntax rule]

1) A database designated by <database name> in <element DB designation> must be defined in <database definition> or <derived database definition>.

2) Each CS designated in <CS list> must be designated explicitly or implicitly in <database definition> or <derived database definition> of the 25 database designated by <database name> immediately before the <CS list>.

3) A schema or a table designated by <schema name 1> or <table name 1> respectively in <replacement element> must be included in a database designated by <database name>.

4) <schema name 2> or <table name 2> in <replacement element> must be unique in <derived database definition>.

[Semantic rule]

1) A database is generated with a CS designated by <CS name> in <CS list> is extracted from the database designated by <database name> in <element DB designation>. This database is named by <derived database name>. If <CS list> is omitted, it is assumed that all CSs of the designated database have been designated.

2) In the database designated by <database name> in <replacement element>, an identifier of a schema (included in the database) designated by <schema name 1> is replaced with <schema name 2>.

Likewise, in the database designated by database name>in <replacement element>, an identifier of a table (included in the database) designated by <table name 1> is replaced with <table name 2>.

3) With respect to a schema or a table not designated in <replacement list>, an identifier is not replaced at all.

By the input of a database define statement 40 or a derived database define statement 41 as described above, the following information is stored in a dictionary 15.

(a) Data base information such as a database identifier (b) Information such as a CS identifier for identifying a composite structure (CS) which forms a database (c) Information relating to a derived database identifier and an identifier of a database to be selected (d) Information of the relation between a derived database and a CS to be selected (e) Information of the relation between an original name and its alias of a schema name or a table name when a name is duplicately assigned among databases.

Described below is an example of a database define statement, etc., in a commodity analysis derived database generated from a divisional database and a central database.

In this example, a database define statement is used for a central database, a manufacturer division database, and a wholesaler division database. The define statement is written as follows:

CREATE DB Central DB FROM (manufacturer information CS, manufacturer commodity attribute information CS, etc.)
CREATE DB Manufacturer DB FROM (sales amount CS, budget CS, etc.)
CREATE DB Wholesaler DB FROM (sales amount CS, etc.)

The definition of associated information other than a derived database is as follows:
CREATE CS Manufacturer CS TYPE B+TREE FROM <schema table name> ON DB01
ALLOCATE DB DB01 <DB area name> TO Manufacturer information CS
  <DB area name> TO Manufacturer commodity attribute information CS Likewise, DB02 is allotted to a manufacturer DB and DB03 to a wholesaler DB. As the description of the define statement is similar to that described above, an example is not shown here.

A derived database define statement is described, for example, as follows:
CREATE VDB Commodity Analysis VDB FROM DB01 (Manufacturer information CS, Manufacturer commodity attribute information CS)
DB02 (Sales amount CS, Budget CS) DB03 (Sales amount CS)

The configuration example of a database manipulating system is explained as follows in association with FIG. 9A.

The input of a bind control unit 50 shown in FIG. 9A is a derived database identifier or a database identifier, and an SQL standard module. A schema name and a table name are given in this module. The schema name and a table name can be an alias designated by a derived database.

The input of a bind control unit 50 is, for example, a statement described as follows:

BIND -m <SQL module file name>
-n Commodity analysis VDB

The content of <SQL module file name> associated with an SQL statement is described as follows:
SELECT * FROM Manufacturer information, Manufacturer commodity attribute information, sales amount, budget, etc.

The above described manufacturer information . . . sales amount are table names in a SQL schema.

The bind control unit 50 notifies a derived database interpreting unit 14 in a dictionary information manipulating unit 13 of a derived database identifier or a database identifier.

The derived database interpreting unit 14 determines elements of a dictionary 15 processed in this binding process. The dictionary elements comprises a sequence of CS identifiers in a generic composite structure, a sequence of schema names of the logical structure definition, a sequence of table names in a schema, original schema names and their aliases and original table names and their aliases.

The processes are performed as follows:

i) All database identifiers and CS identifiers are obtained from derived database identifiers.

ii) A plurality of associated table names are obtained from CS identifiers. Associated schema names are obtained from table names.

iii) Aliases are obtained from table names and schema names.

An optimizing unit 51 obtains logical information and storage information for optimization by providing a logical information manipulating unit 53 in a dictionary information manipulating unit 13 with schema names and table names as inputs.

The logical information manipulating unit 53 outputs a CS identifier and an original name if it is an alias when a schema name and a table name is inputted to a derived database interpreting unit 14. The logical information manipulating unit 53 extracts logical information from table information. If there is a reference restriction defined in an SQI, schema among tables, the logical structure information in the table(s) is also extracted. To update a table associated with the reference restriction, the reference restriction must remain unchanged.

The logical information manipulating unit 53 extracts meta information including physical information under CS information by providing a storage information manipulating unit 54 with a CS identifier. If another table in a reference relation exists, storage information in the table is also extracted.

The storage information manipulating unit 54 comprises a storage structure information manipulating unit 55, a CS space information manipulating unit 56, a CS space/DB area transforming unit 57, and a DB area information management unit 58.

A storage structure information manipulating unit 55 manages primitive information of a data organization which is an element of a CS. The elements of a CS comprise basic data organizations such as a heap, B+ tree, a hash.

The CS space information manipulating unit 56 manages space information assigned to a CS. The CS space/DB area transforming unit 57 transforms a collection of extent information called CS space and DB area. The DB area information managing unit 58 manages extent information associated with DB areas. The extent information includes volume information in physical media and extent information in a volume.

The storage information manipulating unit 54 determines a program for manipulating data organizations associated with a storage structure in a CS. Next, information is taken out of the CS space information manipulating unit 56, a CS space/DB area transforming unit 57, and a DB area information management unit 58 and determines the extent information in a volume to be accessed actually.

According to these results, the optimizing unit 51 outputs a database managing procedure 52 where the optimum process cost for a database can be figured out based on logical information and storage information.

The following process can be performed:

i. The job of a dictionary information manipulating unit 13 can be switched. For example, a derived database interpreting unit 14 can be called by the optimizing unit 51; and derived database identifiers or database identifiers as well as schema names and table names can be inputted when the logical information manipulating unit 53 is called by the optimizing unit 51.

ii. A dictionary 15 can be a table of a relational database, or can be a directory comprising a unique control table structure.

iii. The derived database information on the dictionary 15 can exist in a database accessible during the binding process. When a system is physically distributed, modification can be made on duplicate arrangement and update based on the distributed database method.

iv. A binding process can be performed before or just at the execution of an access to a database.

Figure 9B:
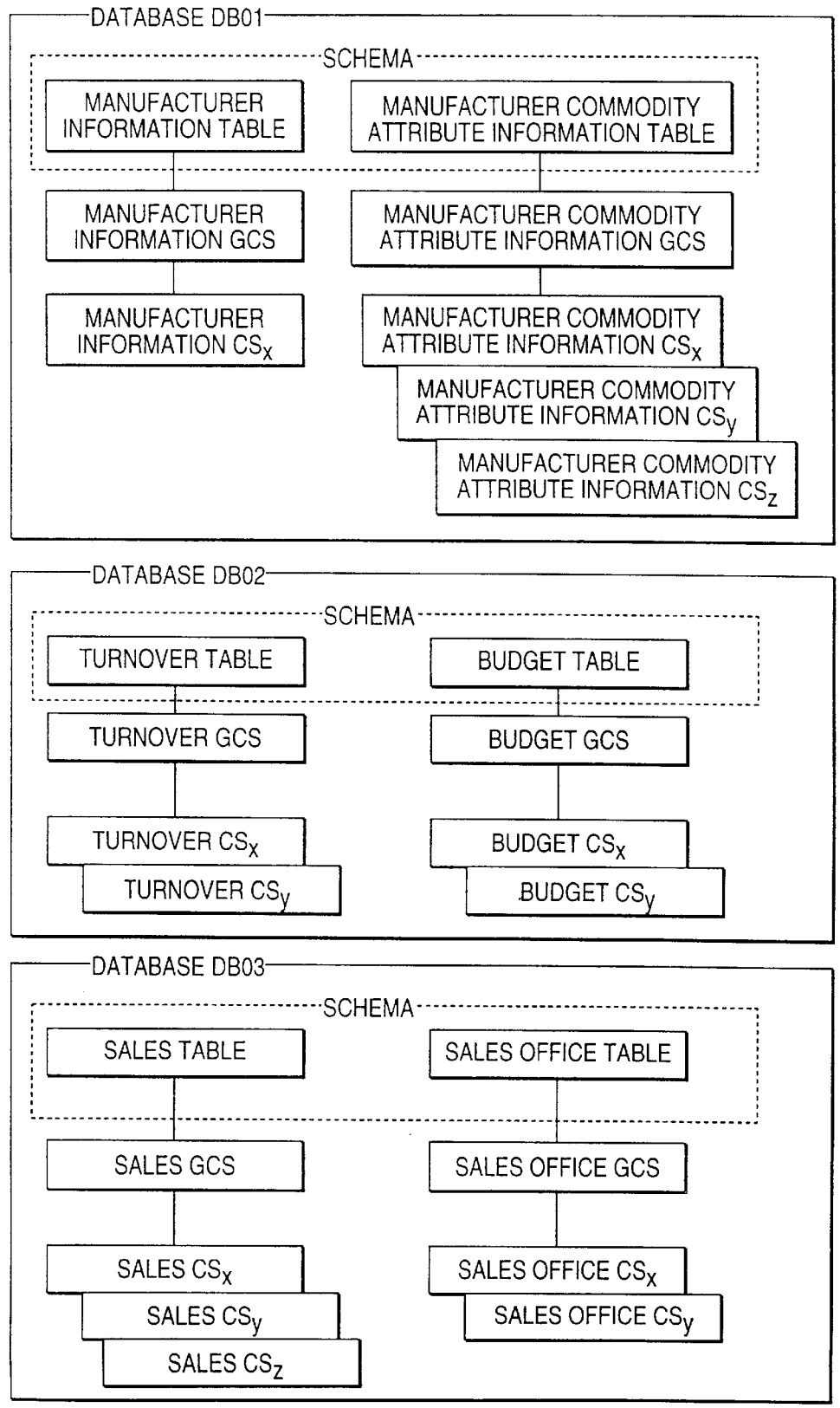
FIG. 9B shows a structure of an demand database forming a derived database.
Figure 9C:
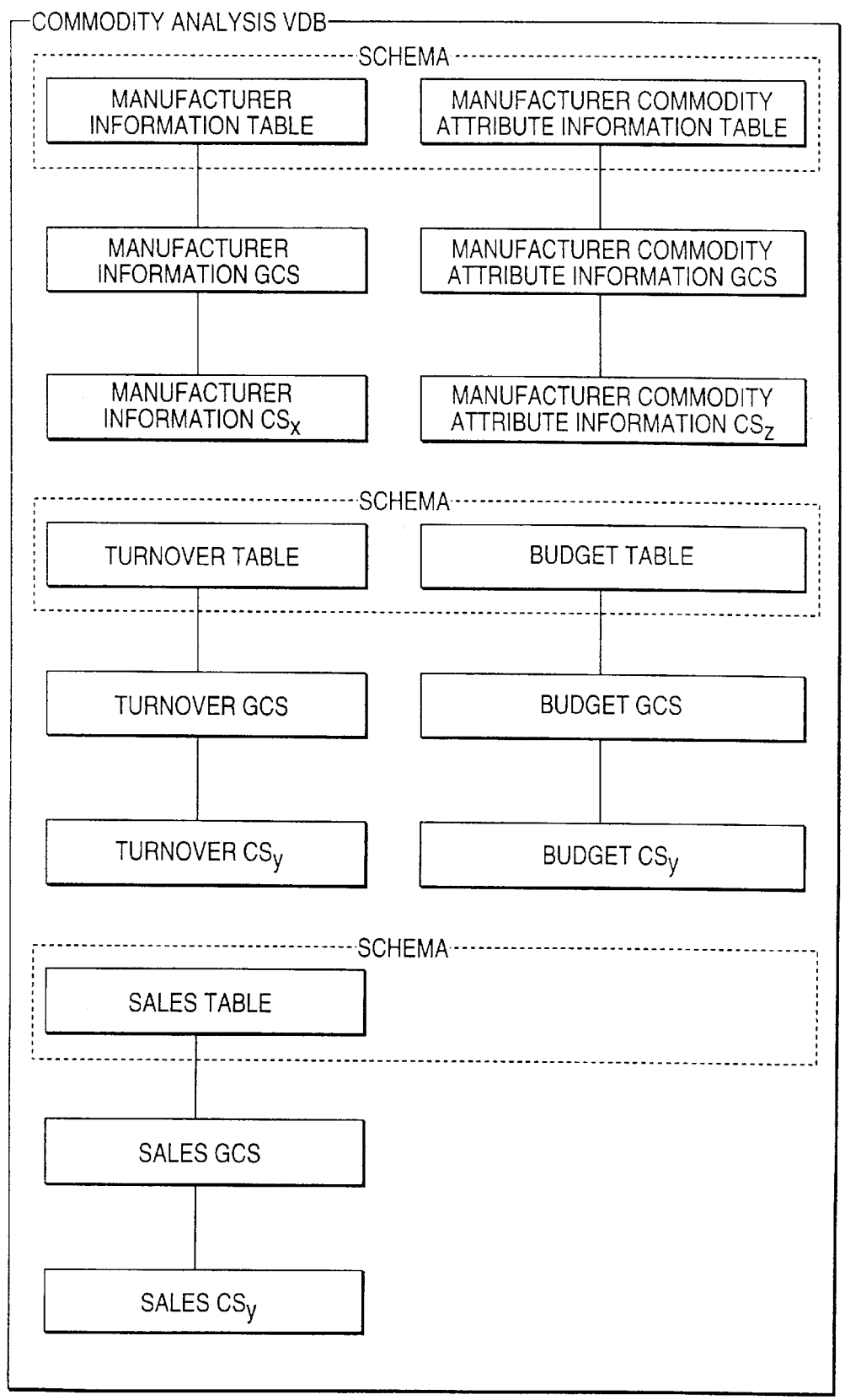
FIG. 9C shows a view from an application program.

The interpreting unit 14 of a derived database (shown in FIG. 9A) is explained more in detail by referring to FIGS. 9B and 9C.

The definition of a derived database is as follows. CREATE VDB Commodity analysis VDB FROM DB01 (Manufacturer information CSx, Manufacturer commodity attribute information CSz)

DB02 (Turnover CSy, Budget CSy)

DB03 (Sales amount CSz)

The above definition includes identifiers of a derived database, database, and a CS. In this supplement, a database described in derived database definition (DB01, DB02, and DB03 in the above example) is referred to as "an element database" of the derived database.

In the dictionary, the information relating to the logical structure (schema, table, column, integrity restriction, etc.), and the storage structure (GCS and CS) of each element database is stored as shown in FIG. 9B.

The information relating to the above database in a dictionary can be referenced using an identifier of an element database and an identifier of a CS as the keys. Based on this information, the logical structure (schema, table, column, integrity restriction, etc.) selected by a derived database and the storage structure (GCS and CS) can be determined. These structures, like an "element" database, can be referred to as an "element ???" of the derived database. As a result, the relation information between an identifier of a derived database and <an element database, element table, element integrity restriction, element GCS, and element CS> are stored as information in a dictionary (in the format 15). In FIG. 9B above, a table, GCS, and CS in the double line block are the element table, element GCS, and element CS of the derived database.

The information of a derived database contains the relation information between an identifier of the derived database and components (an element database, element table, element integrity restriction, element GCS, and element CS), but does not have an entity that an ordinary database has, because these components all belong to an element database.

In this respect, it refers to the same relation between a table and a view. However, it appears to an application program as a single database, as shown in FIG. 1C.

As a view from an application of EL derived database (Commodity analysis VDB in FIG. 2) is the same as an ordinary database, the input of a bind control unit (50) in the explanation of the configuration example of a database manipulation system shown in FIG. 9A can be, for example, described as follows:

BIND -m a file name of an SQL module -n commodity analysis VDB

In the file designated by the file name of the SQL module, a data manipulation statement (an SQL statement as described below) for commodity analysis VDB is stored.

SELECT * FROM Manufacture information table, Manufacture commodity attribute information table, Turnover table, Budget table, and Sales table WHERE locating condition The locating condition in the above described data manipulating statement need not be closed within a single element database, but can cover a plurality of element databases.

As a derived database refers to a view only, the actual data manipulation is performed to each element database (in the above example, DB01, DB02, and DB03). Therefore, in the optimizing process, the data manipulation to a derived database must be performed by splitting the process into data manipulation closed within each element database and data manipulation covering a plurality of element databases. Accordingly, the information relating to components of a derived database (an element database, element table, element integrity restriction, element GCS, element CS) is required.

The information described above can be obtained by accessing a dictionary information manipulating unit (13) shown in FIG. 9A. The components of the dictionary information manipulating unit are described below.

1) A derived database interpreting unit

In a derived database interpreting unit (14), the relation information (15) between a derived database in a dictionary and components are detected using an identifier of a derived database as the key. As a result, an identifier of a component of a derived database (an element database, element table, element integrity restriction, element GCS, element CS) can be output. The components identified by these identifiers are considered in the optimizing range.

2) A logical information manipulating unit

In a logical information manipulating unit (53), the information of the elements relating to the logical structure (an element table, element integrity restriction) in the components of a derived database is manipulated. The information relating to the elements of the logical structure (for example, definition information of an element table) can be outputted with an identifier of an element relating to the logical structure as the key.

3) A storage information manipulating unit

In a storage information manipulating unit (54), the information relating to the storage structure (an element GCS and element CS) in the components of a derived database is manipulated. The information relating to the elements of the storage structure (for example, definition information of an element CS) can be outputted with an identifier of an element relating to the storage structure as the key.

Figure 10:
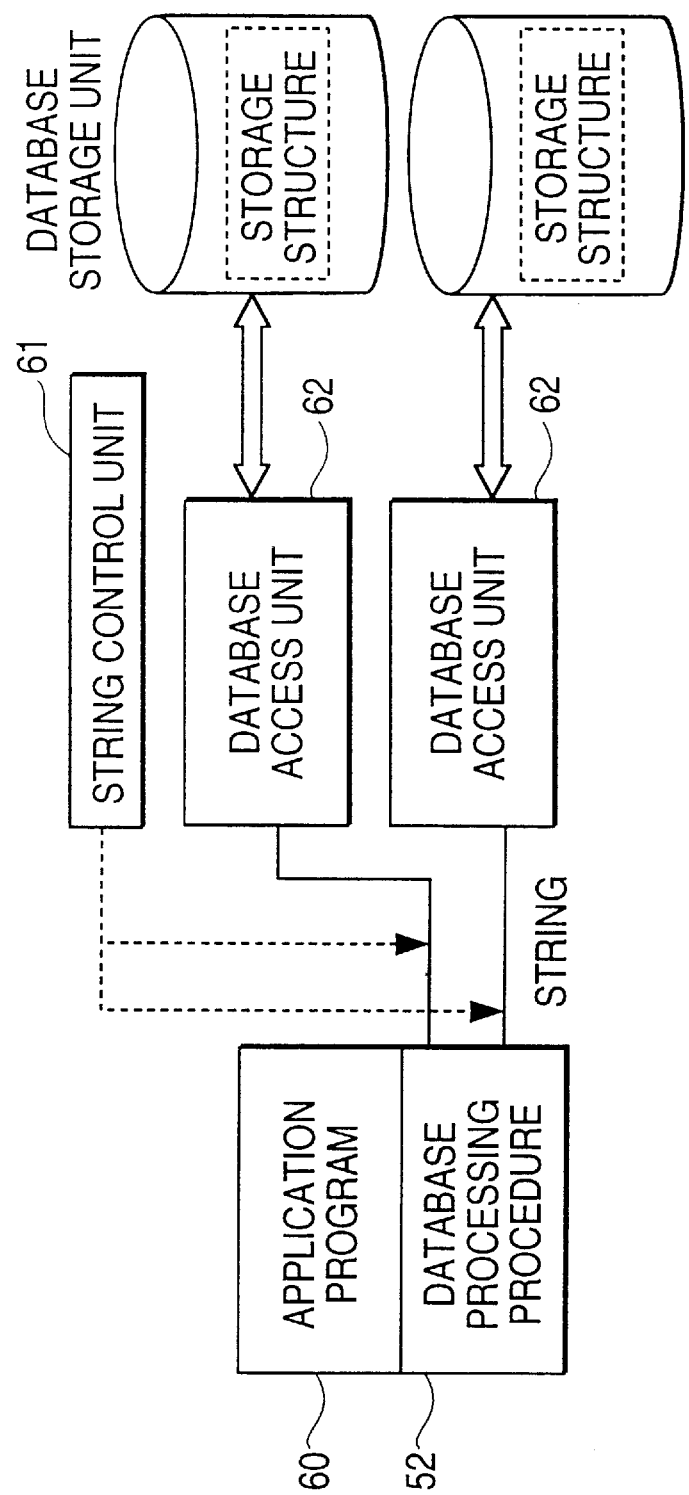
FIG. 10 shows an example of a runtime operational configuration applied with an embodiment of the present invention.

FIG. 10 shows an example of a operational configuration being executed and relating to an application program 60 including a database processing procedure 52 generated as described above.

For example, an object of an application program 60 written in a host language such as C language and COBOL and a database processing procedure 52 are linked. They can be linked either by a pre-linkage through a linkage editor or a runtime dynamic linkage.

A string control unit 61 is used to control linkage of an application program 60 and a database access unit 62. The database access unit 62 performs input and output to a database storage 16 according to the storage structure of data to be accessed which is determined by the database processing procedure 52, and according to the DB space information, etc. The above described process is shown in FIG. 10, and can be configured as in the prior art technology.

As described above, the present embodiment permits an application program to access a plurality of independent databases, thus providing flexible services for diversified and high level user requests. As an application program can access a plurality of databases simultaneously, the following effects and advantages can be obtained:

1. Among independently developed databases, cross reference to a table among databases, transmission of data, and update of data can be performed by one application program.

2. Between a divisional database and a central database, it is very difficult to make an adjustment among divisional databases, but an alias assignment function allows an application program to process a plurality of divisional databases simultaneously and to perform data reference between a divisional database and a central database, and perform data transmission simultaneously.

3. Between independently processed databases having the same schema structure, data in tables equally defined and distributed in a plurality of independently processed databases can be processed by an application program.

4. Between a private and shared databases, the private database and the shared databases can be processed simultaneously by an application program.

5. Between test data and a production database, the production database can be used in a test by intermixing the test data as a test database with the production database to be accessed for reference by an application program.

Additionally, as any table can be selected among a plurality of databases for use in a derived database, accidental destruction of data can be avoided by accessing only selected tables for the derived database.

Even though duplicate names are found between databases, an alias can be assigned by the definition of a derived database, and the range of data to be processed by an application program can be extended easily without modification to existing databases.

Figure 11A:
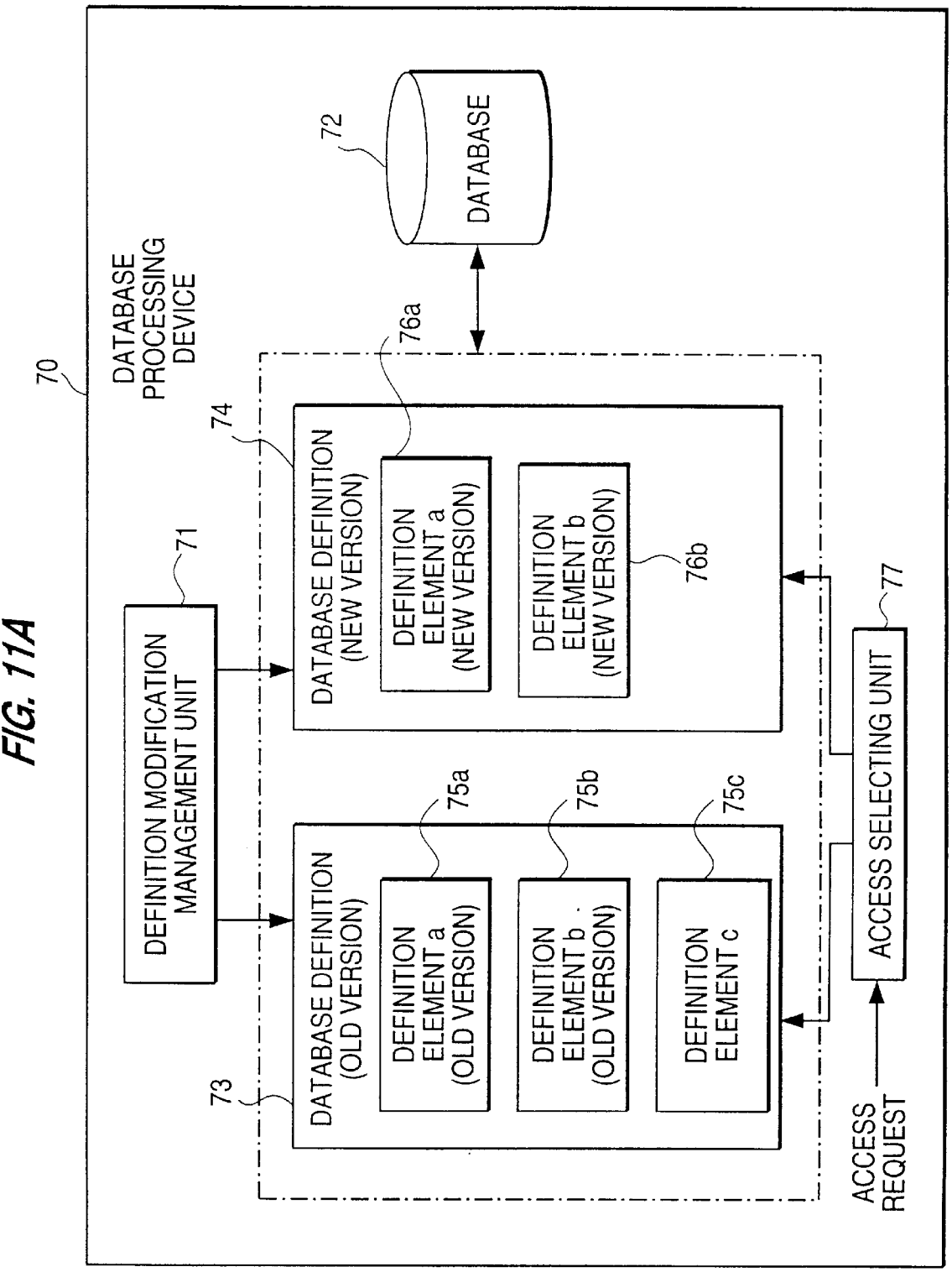
FIGS. 11A and 11B show an explanatory view of the principle of another embodiment of the present invention.
Figure 11B:
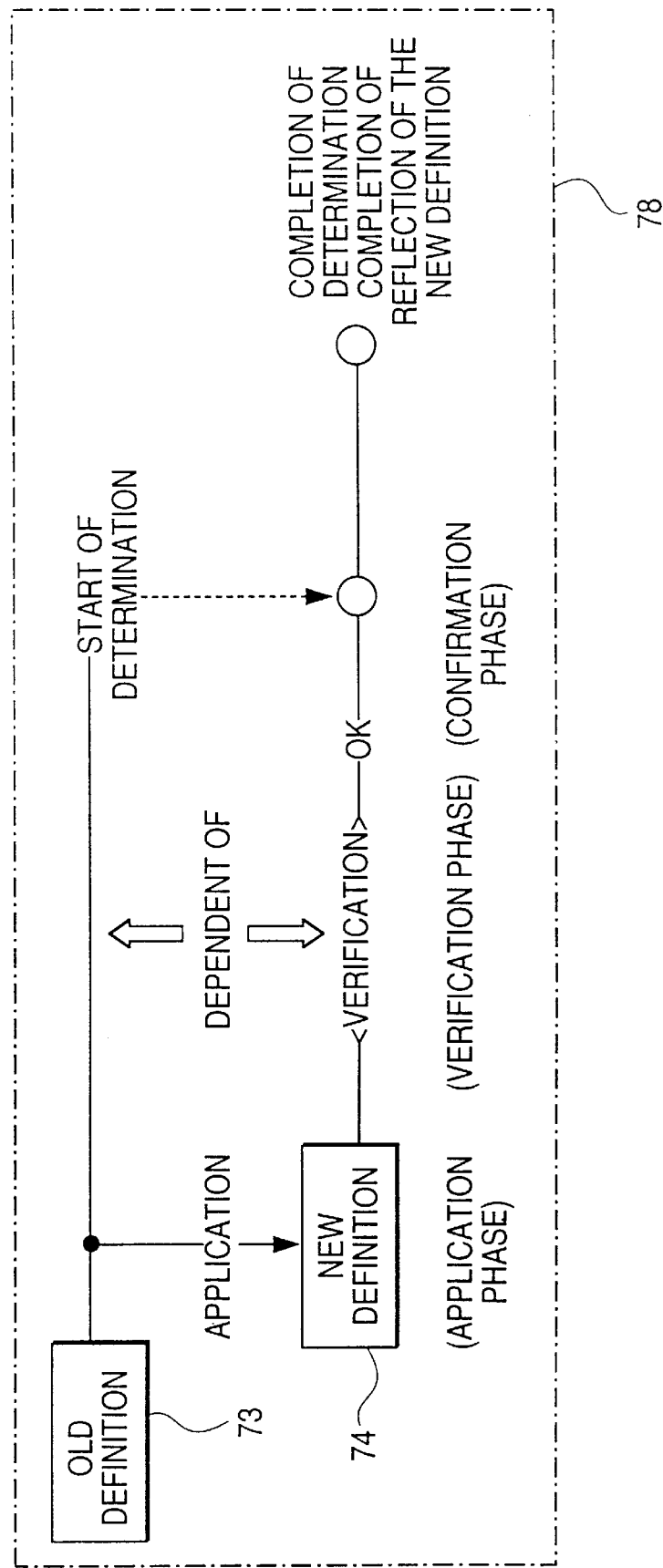

FIGS. 11A and 11B show an explanatory view of the principle of another embodiment according to the present invention.

In FIGS. 11A and 11B, 70 show a database processing device comprising a CPU and a memory; 71 shows a definition modification management unit; 72 shows a database, 73 shows an old version of a database definition; 74 shows a new version of a database definition; 75a–75c, 76a, and 76b show definition elements associated with a logical structure and storage structure of a database, 77 shows an access selecting unit; and 78 shows a definition modification model.

A definition modification management unit 71 manages database definition information in each definition element of a before-modification (an old version) database definition 73 and an after-modification (a new version) database definition 74. The definition modification management unit also provides a mechanism for checking the consistency of the definition information of a new version.

An access selecting unit 77 selects, in response to an access request for the database 72, an access using a before-modification database definition 73 or an access using an after-modification database definition 74, and then realizes an access according to the selected definition information.

A database processing device 70 of the present invention comprises such a definition modification managing unit 71, manages old version definition information, new version definition information, and the relation among them, allows either the old version or the new version definition information to be selected at an access request through an access selecting unit 77, and comprises a mechanism in a database management system for replacing old version information using new version information when a modification of all definition elements that are necessary is confirmed.

In the definition modification processing method in the present invention, as shown in FIG. 11B, a definition modification model 78 is provided in the database management system, comprising an application phase for making a new version database definition 74 available in coexistence with an old version database definition 73, a verification phase for verifying during the operation using said old version database definition 73 and by executing a test program to see if said applicable new version database definition 74 meets the purpose of modification, and a confirmation phase for replacing an old version database definition 73 with a verified new version database definition 74, wherein the definition is progressively modified for each definition element in units of definition modification model.

Data base definition elements comprise logical structure definition elements such as a schema, table, column, integrity constraint, etc., storage structure definition elements such as generic composite structure relating to data organizations, etc., and physical structure definition elements indicating the location of data in physical media. The definition of a database comprises these definition elements and the relation information among them.

The requirements of definition modification are:

① A definition modification model is required for ensuring consistency of database interpretation after executing the definition modifying operation; and ② The modified definition must be verified by actual test data, etc. to determine whether the modification meets the original purpose.

To meet the above described requirements, the definition must be modified based on the relation among definition elements, and every inconsistency must be corrected by repeating the operation to meet the purpose of the modification.

For example, when a table is deleted, the definition element of the storage structure that refers to the table is influenced by the deletion. The overall integrity can be retained by deleting or modifying a definition for each of the definition elements that are influenced by modification. Then, an access module is bound or linked to the adjusted definition element to verify, using actual definition data, that the definition modification meets the original purpose.

In the present invention, as an operation model required for definition modification is provided in a database management system, the definition is modified not ad hoc, but using a predetermined plan and procedure based on a definition modification model with little affect on the practical operation of a database.

Figure 12:
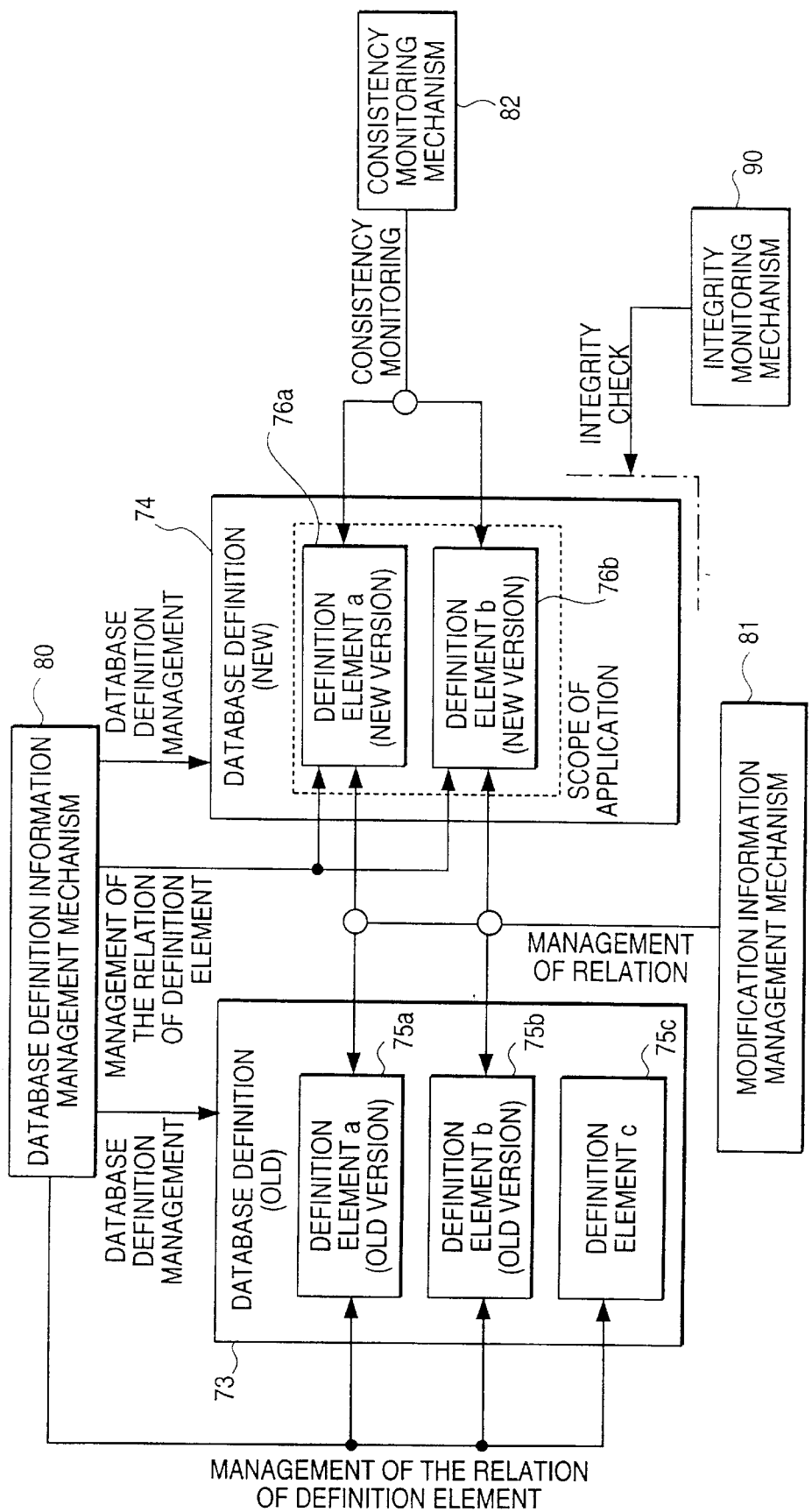
FIG. 12 shows a configurational view of the definition modification management method applied in the present invention.

FIG. 12 shows a configuration example of a definition modification management unit 71 shown in FIG. 11.

A definition modification management unit 71 comprises, as shown in FIG. 12 for example, a database definition information management mechanism 80, a modification information management mechanism 81, a consistency monitoring mechanism 82, and an integrity monitoring mechanism 90.

The database definition information management mechanism 80 adjusts information of database definition elements, and manages them using their identifiers in each level such as a logical, storage, and physical level.

The modification information management mechanism 81 manages, for each database definition element, before-modification (old version) and after-modification (new version) including the relation between them. In the example shown in FIG. 12, a definition element 75a is modified to a definition element 76a, and a definition element 75b to a definition element 76b. The information related to the above described modification is managed as follows.

The information of a new version database definition 74 does not have to contain all related information in performing the present invention, but has only to contain the difference information associated with the modification that is different after the modification from the old version database definition 73. Copies can be used instead of difference information.

The consistency monitoring mechanism 82 monitors, in the applying operation the identification of an applicable range and the the consistency among definition elements in an applicable range, that is, the applicability.

Figure 13:
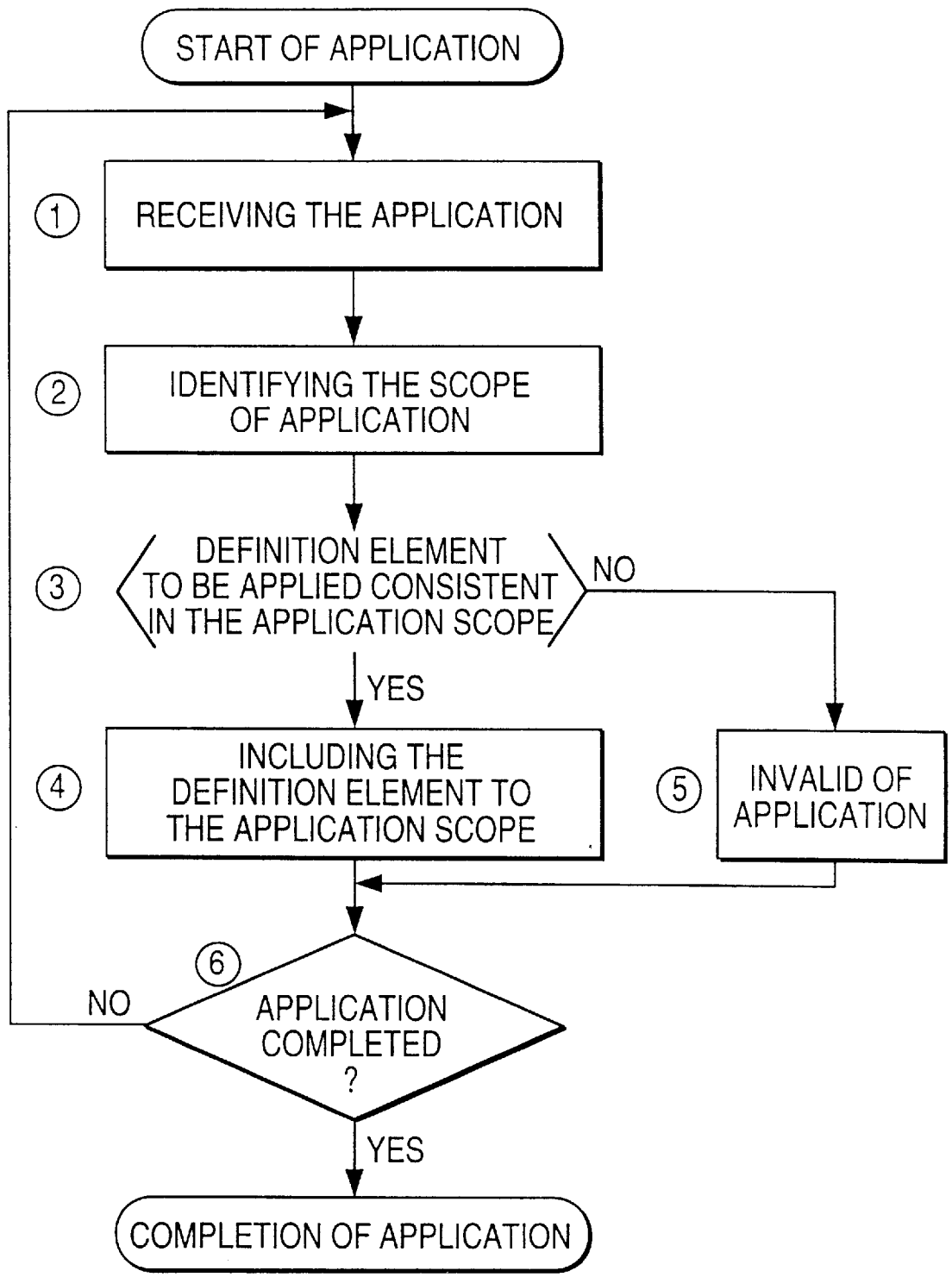
FIG. 13 shows a flowchart of a consistency monitoring mechanism applied in an embodiment of the present invention.

FIG. 13 shows a flowchart of the consistency monitoring mechanism 82 to be used in an applying operation.

① First, an applying operation is accepted, and definition elements to be applied are identified.

② An application range is identified. In the example shown in FIG. 12, the application range contains a database definition 74 in a new version including a definition element 76a and definition element 76b.

③ The consistency of definition elements to be applied in the application range is checked. If no inconsistency is found, control is transferred to process 4; if inconsistency exists, control is transferred to process 5.

④ If there is no inconsistency, the definition elements to be applied are admitted in the application range. Then, control is transferred to process 6.

⑤ If there is inconsistency, the applying operation up to this point is judged as invalid and gets to no effect.

⑥ Determination is made as to whether all necessary applying operation is completed. If not, processes from step ① must be repeated again. If yes, all definition elements are judged as applicable, and the applying operation is completed successfully.

Consistency means that there is no inconsistency among the definition elements in a specific application range (usually, a sub-definition of a database definition). As for integrity, it is checked within the range covering a whole database and associated application programs.

Figure 14A:
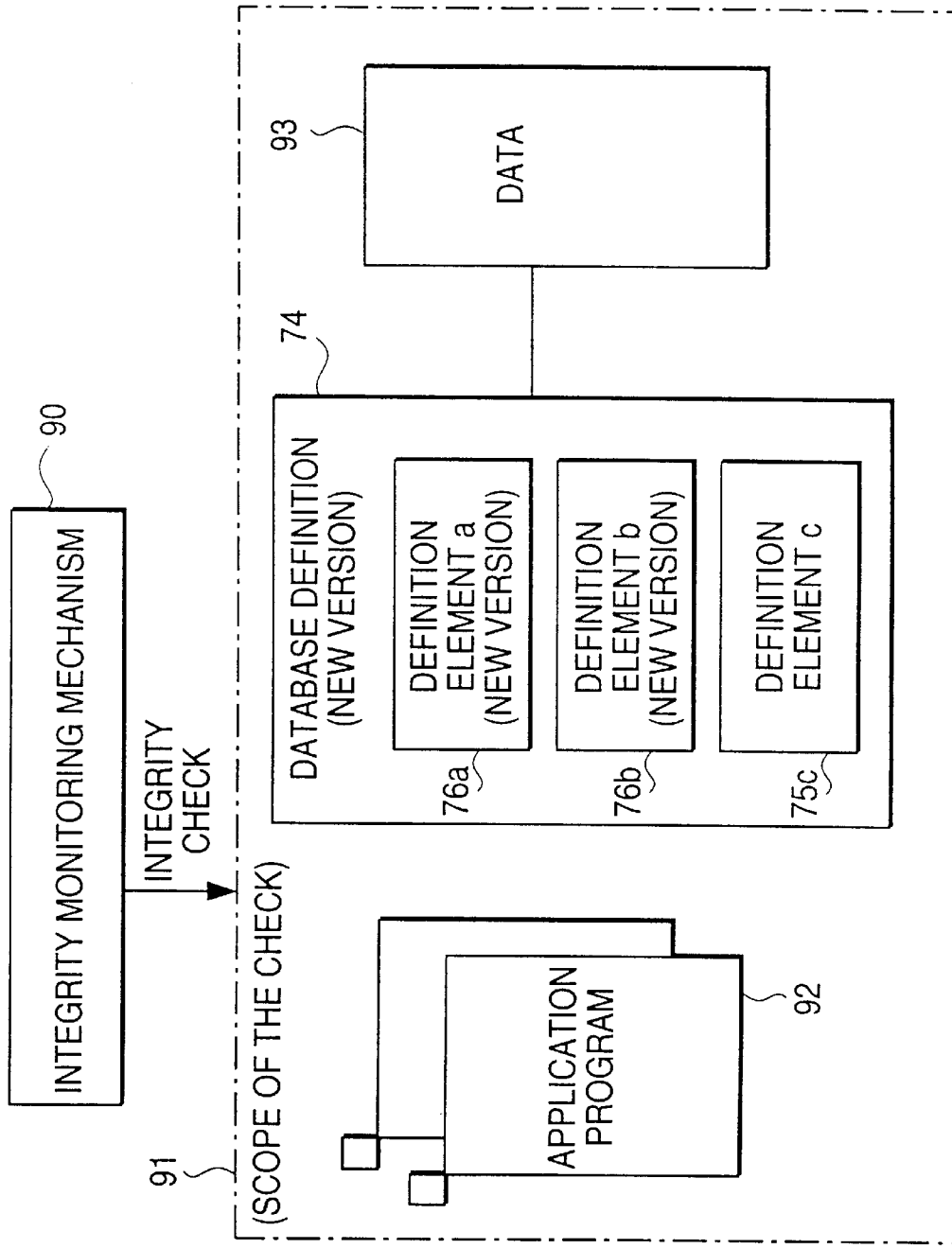
FIGS. 14A and 14B show an explanatory view of an integrity monitoring mechanism applied in an embodiment of the present invention.

FIG. 14A shows the position of an integrity monitoring mechanism 90 shown in FIG. 12.

The integrity monitoring mechanism 90 monitors the integrity of other objects such as database definition elements affected by definition modification and application programs 92. A check range 91 covers an application program 92, a new version database definition 74, data 93 to be actually accessed, etc.

Figure 14B:
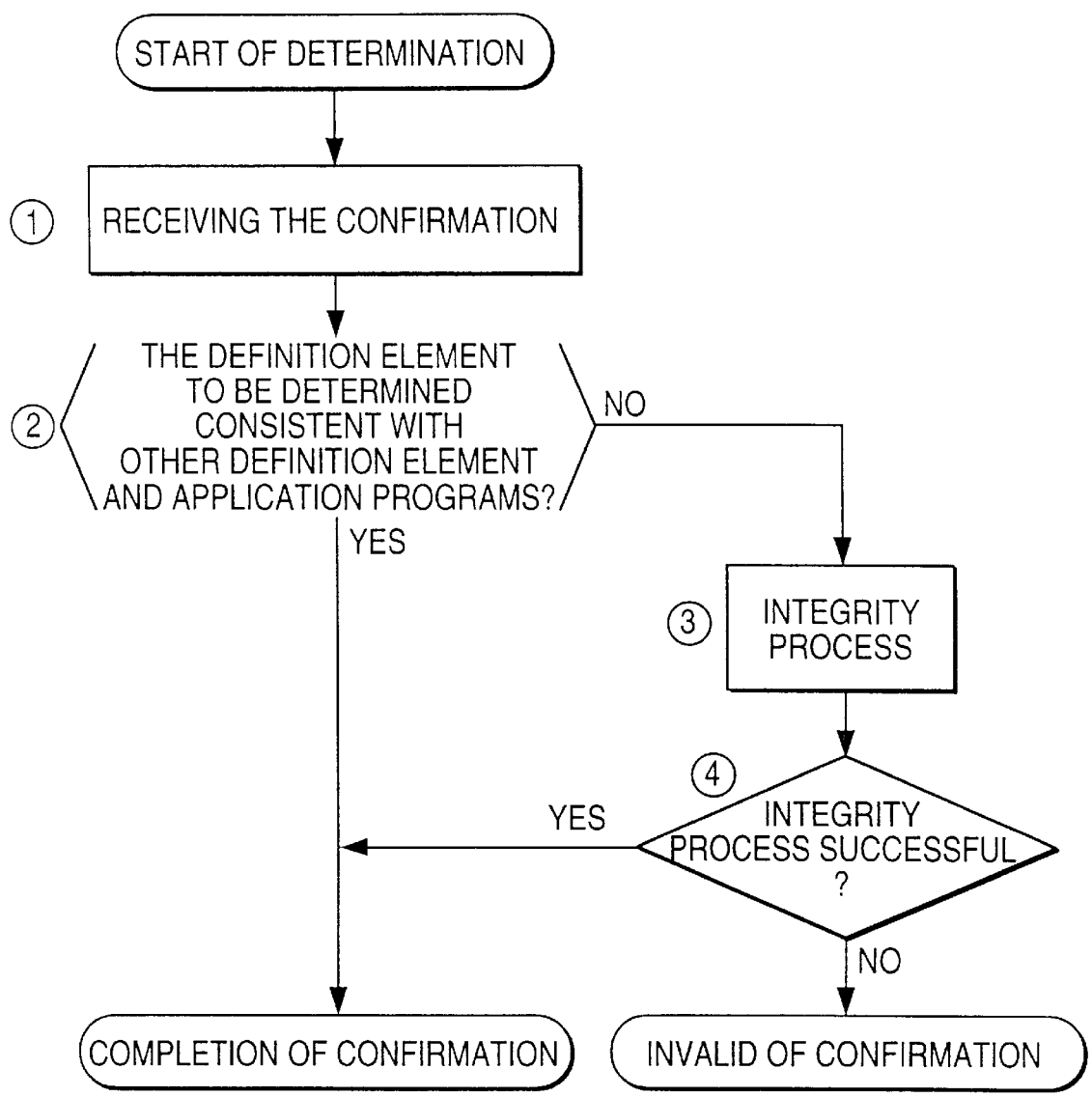

FIG. 14B shows a flowchart of the integrity monitoring mechanism 90 in the confirming operation.

① First, a confirming operation is accepted, and definition elements to be confirmed are identified.

② The definition elements to be confirmed are checked whether they conform, with respect to data integrity, to other definition elements and application programs 92. If yes, the confirming operation is completed successfully.

③ If not, an integrity operation must be performed. An integrity monitoring mechanism 90 checks for the integrity. In the practical integrity operation, a user may participate.

④ If the integrity operation is successfully over, it is judged as being over. If the operation fails, the confirming operation is judged as invalid.

FIG. 15 shows an explanatory view of an access selecting unit 77.

The access selecting unit 77 allows, when definition information is being accessed, either before-modification (old version) definition information or after-modification (new version) definition information to be selected. The access selecting unit 77 cannot be used by an application program which simultaneously accesses to the definition information comprising both new and old version definition information, but can be used for verification of the new version definition information during the operation using the old version definition information.

Figure 15B:
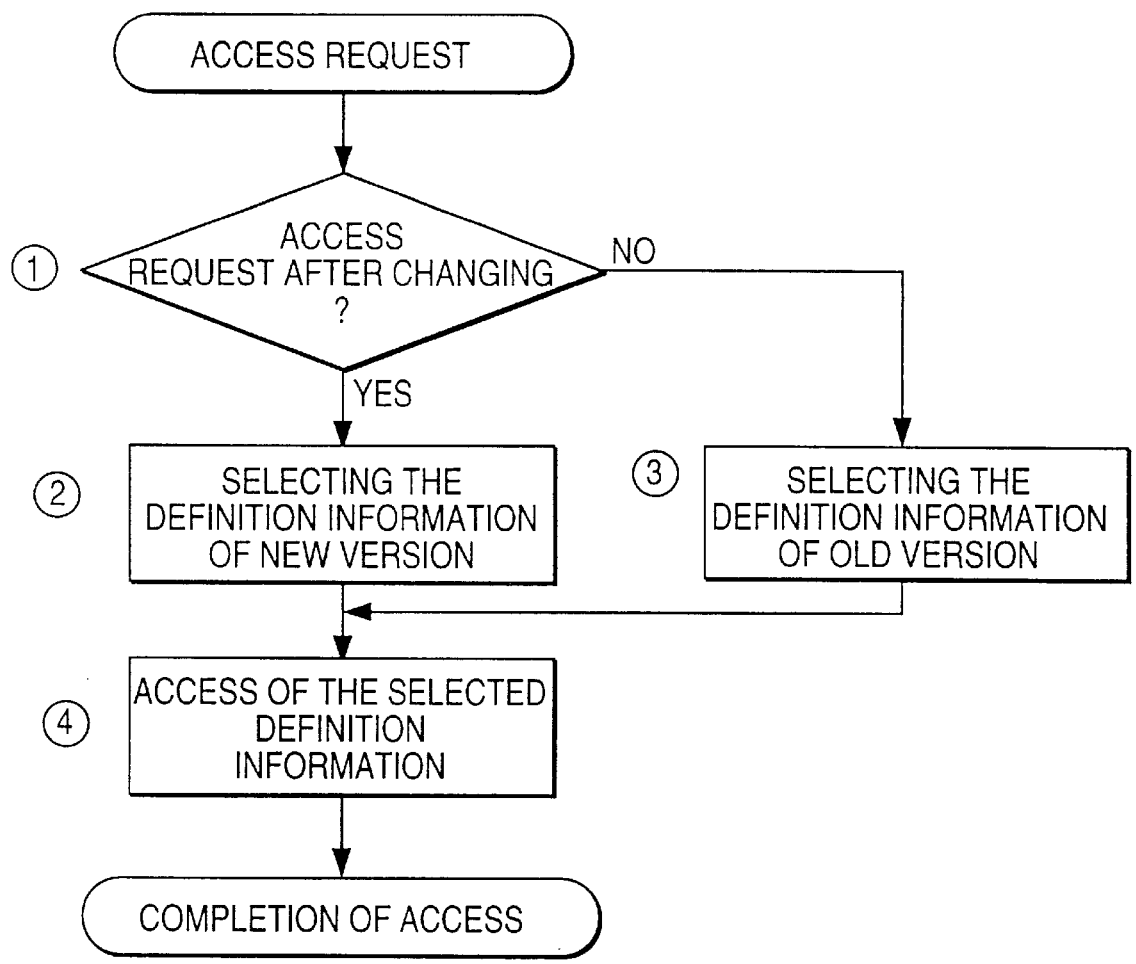

FIG. 15B shows a flowchart of an access selecting unit 77.

① In response to an access request, it is checked whether it is an access request to an after-modification (new version) definition.

② If it is an access request to an after-modification definition, a new version database definition 74 is selected.

③ If it is an access request to a before-modification definition, an old version database definition 73 is selected.

④ Now, either the selected database definition 73 or 74 is accessed, thus obtaining necessary definition information.

Figure 16A:
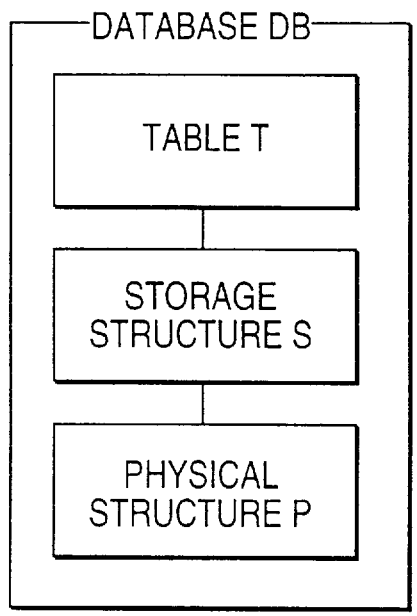
FIGS. 16A and 16B show an example of definition modification for explaining an embodiment of the present invention.
Figure 16B:
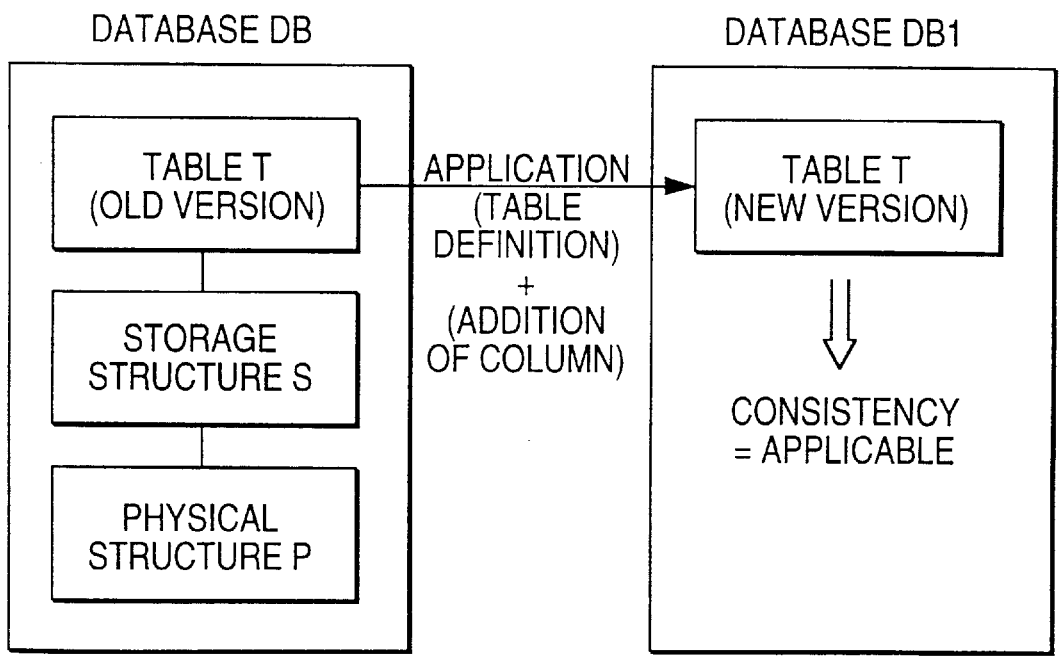

Next, an example of definition information is described in association with FIGS. 16 to 18.

As shown in FIG. 16A, a before-modification database (identifier DB) is expressed in a logical structure definition table (identifier T), generic composite structure (identifier S), and a physical structure definition (identifier P).

Each mechanism is described as follows, for example by adding a column C to the table T:

A new database definition can be generated by performing an applying operation using an input of a definition modification statement. An identifier of a new version database can be expressed implicitly or explicitly by adding a subscript to an identifier of the old version database.

In this example, the following table modification statement in an SQL language (for adding a column) is applied as a target of a new database (identifier DBI)

"ALTER TABLE T ADD COLUMN C description of a column"

The consistency monitoring mechanism 82 shown in FIG. 12 determines whether a new version table definition really contains no inconsistency.

In this example, the table definition statement "CREATE TABLE T . . . " is applied to the target database DB1 simultaneously. As a result, the above described table definition statement together with the table modification statement (for adding a column) admits generating a consistent and applicable table definition. An old version database definition is independent of a new version database definition. The relation between the new and old versions can be managed by the database definition information management mechanism 80 and the modification information management mechanism 81.

In the verifying process of a new version table, a check is made using actual data and programs to determine whether the modification meets the original purpose. There are two methods available for the check.

Figure 17A:
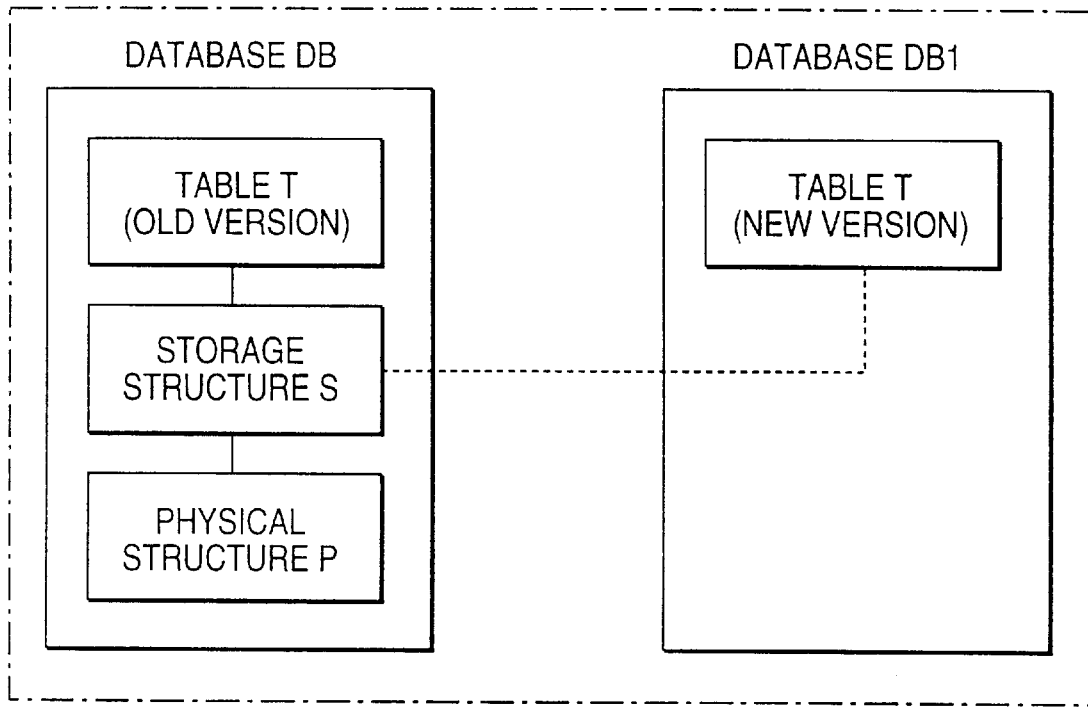
FIGS. 17A and 17B show an example of a verification method in the definition modification of an embodiment of the present invention.

One method is shown in FIG. 17A, indicating the utilization of a lower layer (storage definition and physical definition) of an old version database.

Figure 17B:
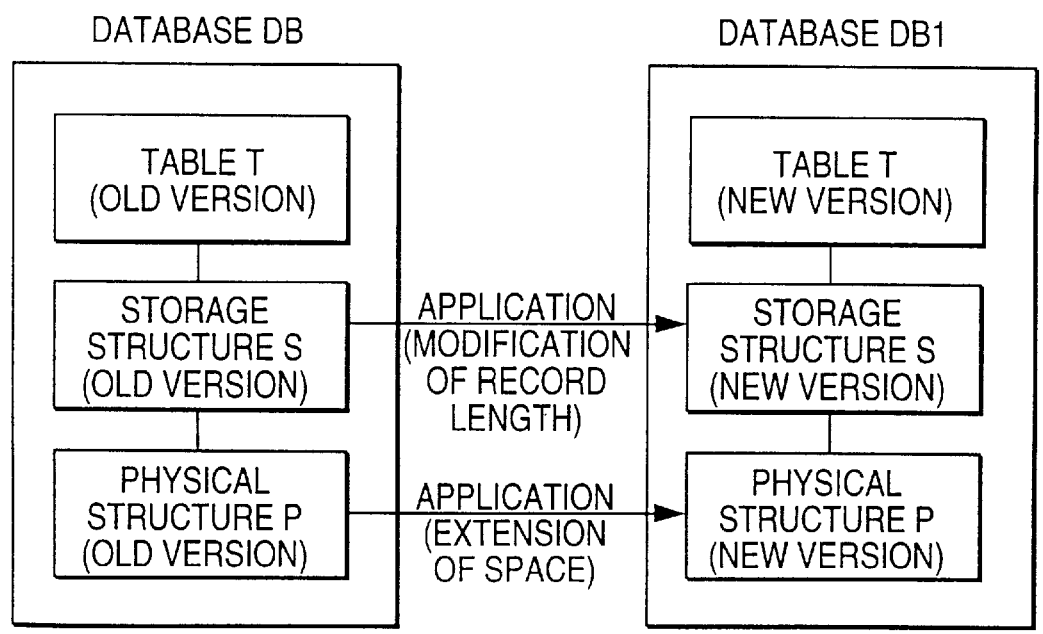

The other method is shown in FIG. 17B, performing an applying operation of definition modification on lower layers of the old version database to ensure the conformity to the new version database for obtaining the integrity of the whole database. In this method, a column is added to the table T; a record length is changed in the storage structure S; and space is extended in the physical structure P.

In this phase, as shown in FIG. 14A, the integrity monitoring mechanism 90 checks the integrity of a new version in the whole database, and the integrity to an accessing module (an application program).

An access selecting unit 77 shown in FIG. 11, etc. selects either a new or an old version database, permitting an access. However, this does not allow a new version to co-operate with an old version.

In this example, the result comes in the following two determinations:

(Case 1) If the value in the added column C is determined to be ineffective (null), the generic composite structure and the physical structure definition need not be modified.

(Case 2) If it is determined as a result of the addition of a column C that the record length of the generic composite structure should be changed and the space in the physical structure definition should be extended, the generic composite structure and the physical structure definition must be modified.

If it is confirmed that the definition modification meets its original purpose as a result of the verification, the confirmation phase can be started for the modification of the table definition. In the confirmation phase, confirmation in upper layers can be completed based on the completion of the confirmation of lower layers.

Therefore, if the above (Case 1) is true, only the interpretation of the generic composite structure and the physical structure definition should be modified a little, but the definition itself is not modified at all (referred to as a copy level). If the above (Case 2) is true, the confirmation of the table definition modification is completed based on the completion of the confirmation of the generic structure definition (modification of a record length), and the confirmation of the generic composite structure (modification of a record length) is completed based on the completion of the confirmation of the physical structure definition (extension of the space).

Transmission and reorganization of data may be, but does not have to be, interlocked with physical definition layers.

Figure 18A:
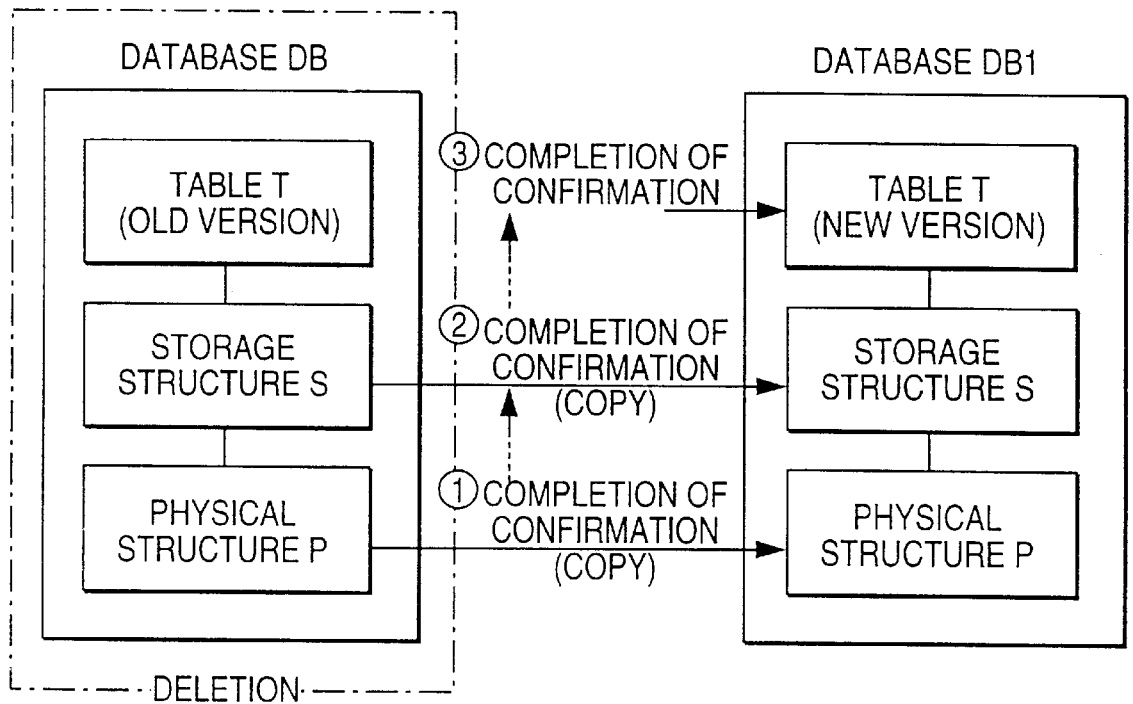
FIGS. 18A and 18B show an explanatory view of a sequence for completing the confirmation applied in an embodiment of the present invention.
Figure 18B:
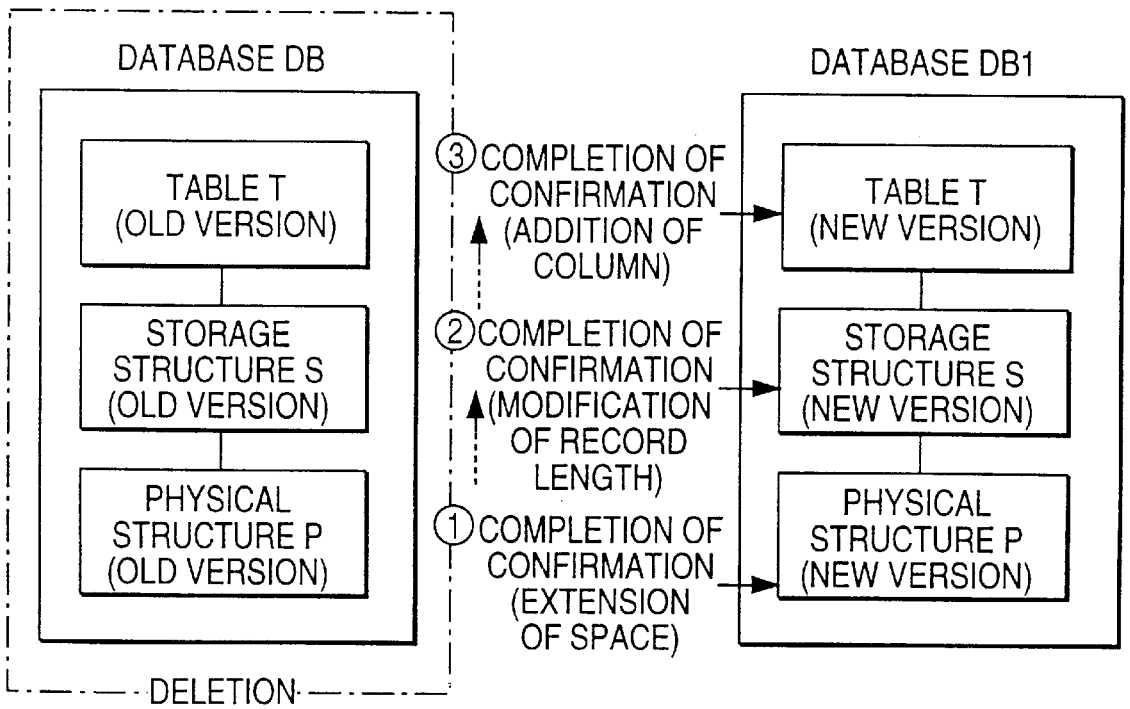

FIG. 18A shows the sequence of the complete confirmation where the lower layer definition in an old version database is used. FIG. 18B shows the sequence of the complete confirmation where the lower layer definition of an old version database is modified.

Next, a basic model of the operation and the state of definition modification are explained as follows.

An ordinary model of definition modification is a transient model to be settled to the final after-modification state by way of the before-modification state and the intermediate state. The intermediate state is a transient state during the definition modification where data in a database cannot be processed, thus halting operation of the database.

By contrast, a definition modification model applied in the present invention, as shown in FIG. 11B, considers a new version modified using a new definition an object which is independent of a before-modification definition and co-exists with an old version definition, reducing a disruptive influence on the operation of the database.

A new definition modification model 78 shown in FIG. 11B comprises an application phase, a verification phase, and a confirmation phase. A summary of respective phases as follows.

(a) In an application phase, a new definition description is applied; definition information of the application state (hereinafter referred to as meta data) is generated; and all definition elements are adjusted until determined to be consistent and practically applicable.

(b) In a verification phase, actual data and program are checked to determine whether the meta data in the application state meet the original purpose of the modification.

(c) In a confirmation phase, an old version database is replaced with a new version database after the determination is made in the verification phase that the meta data in the application state meet the original purpose of the modification.

Figure 19:
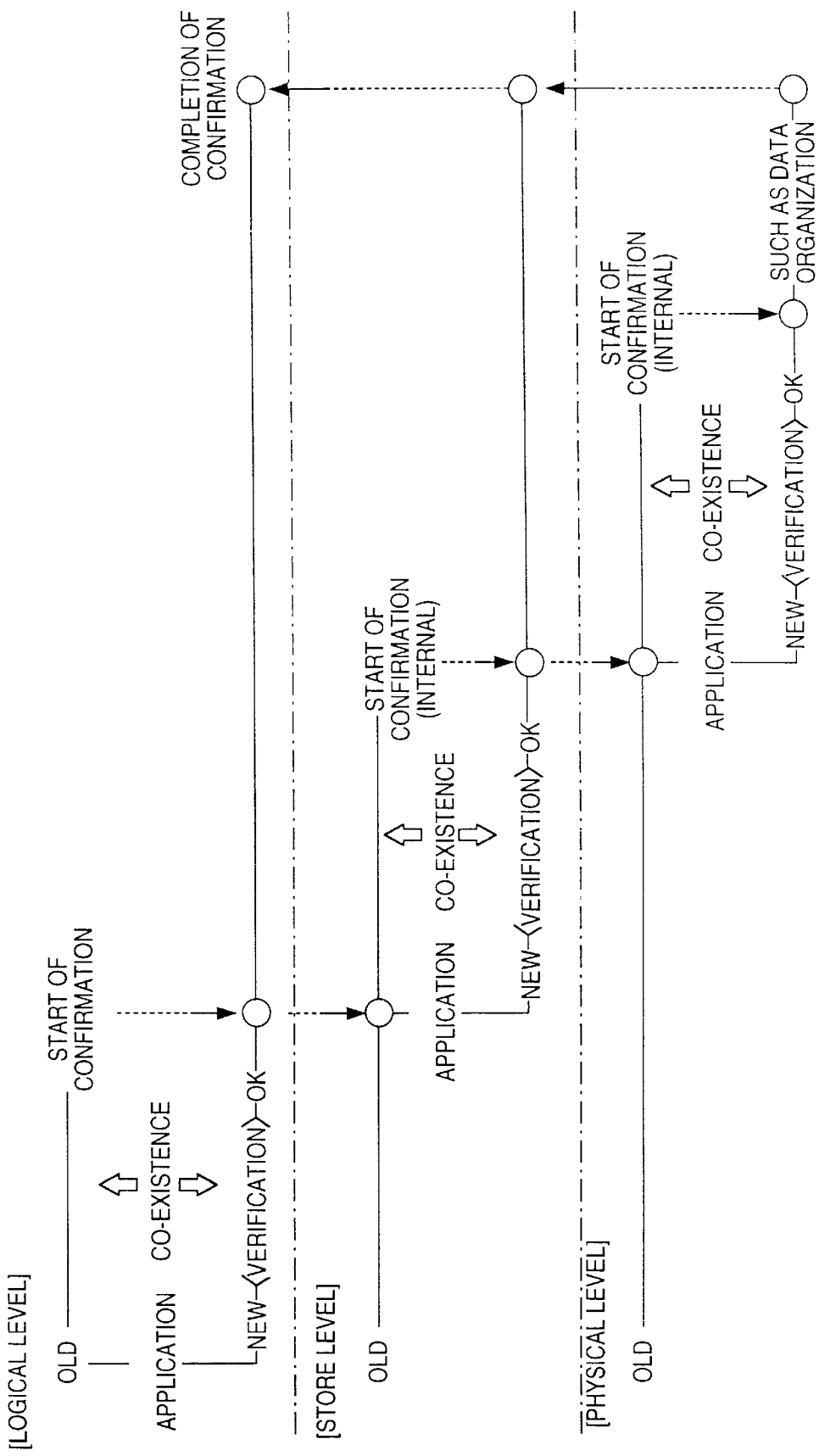
FIG. 19 shows an explanatory view of definition modification in a multi-abstraction configuration applied in an embodiment of the present invention.

The definition modification model 78 is applied in each abstraction of a logical level, storage level, and physical level. FIG. 19 shows a process flow in a multi-abstraction configuration. Layers of definition elements are not limited only to the logical level, storage level, or physical level. The layers of the present definition modification model 78 is only an example.

When the definition modification is reflected in every abstraction, the definition modification is completed.

In the modification of the logical structure definition, a new definition is first applied at the logical level, and then verified in the state where it co-exists with an old definition. At the beginning of the confirming operation of the logical structure after the verification, definition modification is induced at the storage level if necessary. Likewise, at the beginning of the confirming operation of the storage structure, definition modification is induced in the physical level.

Each of the above described phases are explained as follows.

(Application Phase)

Figure 20:
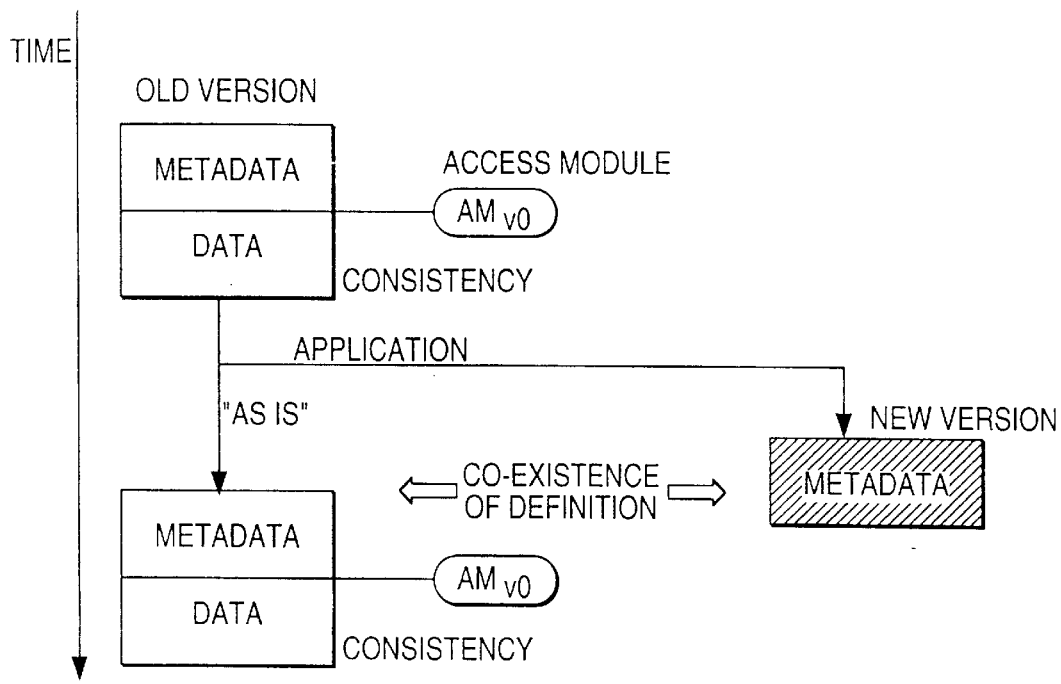
FIG. 20 shows an example of an applying operation and meta data generation applied in an embodiment of the present invention.

In the application phase, one or more definition modifications are specified, and then the applying operation is performed. FIG. 20 shows examples of the applying operation and an example of generation of meta data.

After performing a basic syntax check for the definition modification specified by the applying operation, a new version definition is generated with the specification fully reflected on it. Then, as shown in FIG. 20, an old version remains as is. Data relating to the old version is not affected by an applying operation.

When a new version definition is generated with integrity, the applying operation can be determined as being successfully completed. This state is referred to as an applicable state.

If a single applying operation cannot obtain the integrity, a plurality of applying operations are combined and obtain the integrity, that is, the applicable state. An applying operation can replace an existing applying operation, but usually, a plurality of applying operations are processed at the same level, and cannot be assigned priority.

A result of an applying operation can be canceled, permitting deletion of a new version which is generated by the corresponding applying operation.

Figure 21:
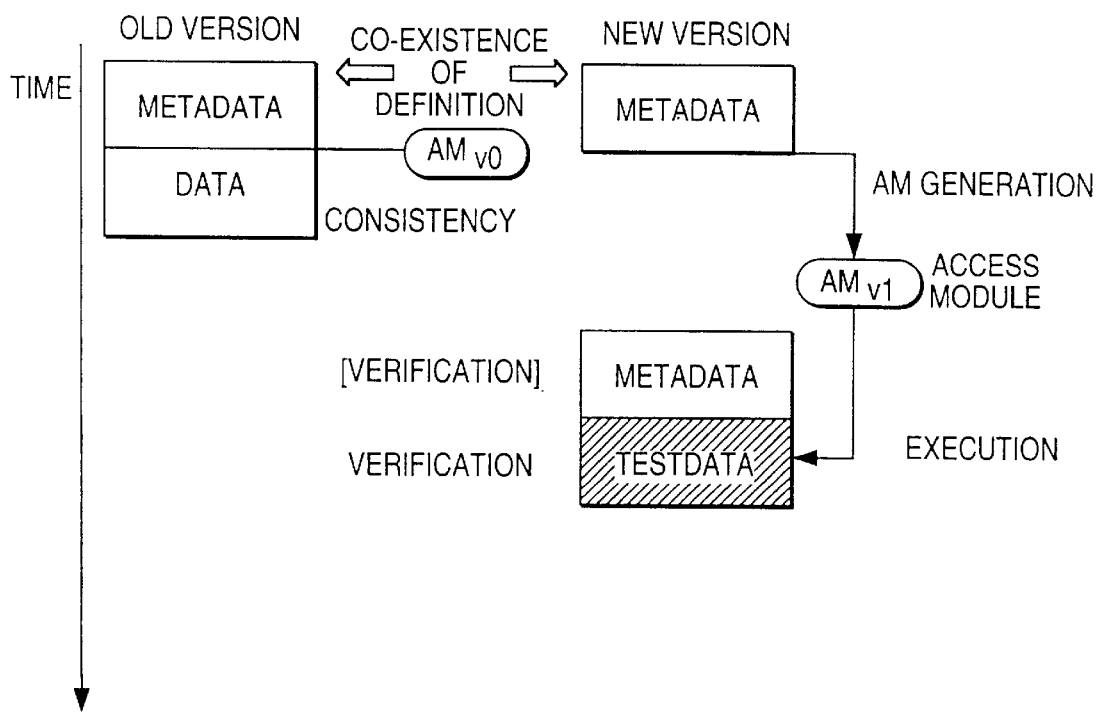
FIG. 21 shows a verification example of a new version applied in an embodiment of the present invention.

(Verification Phase) In the verification phase, a check is made to determine whether the modification meets the original purpose by actually executing a test program on an applicable version (in this case, generating an access module AM using a new version, preparing test data, etc.). FIG. 21 shows a verification example of a new version.

As a result of the verification, (1) a new version is accepted as is; (2) definition modification is continued to meet the original purpose; or (3) the modification is rejected. In case (3), a new version definition is deleted by canceling the applying operation of the corresponding definition modification.

(Confirmation Phase)

Figure 22:
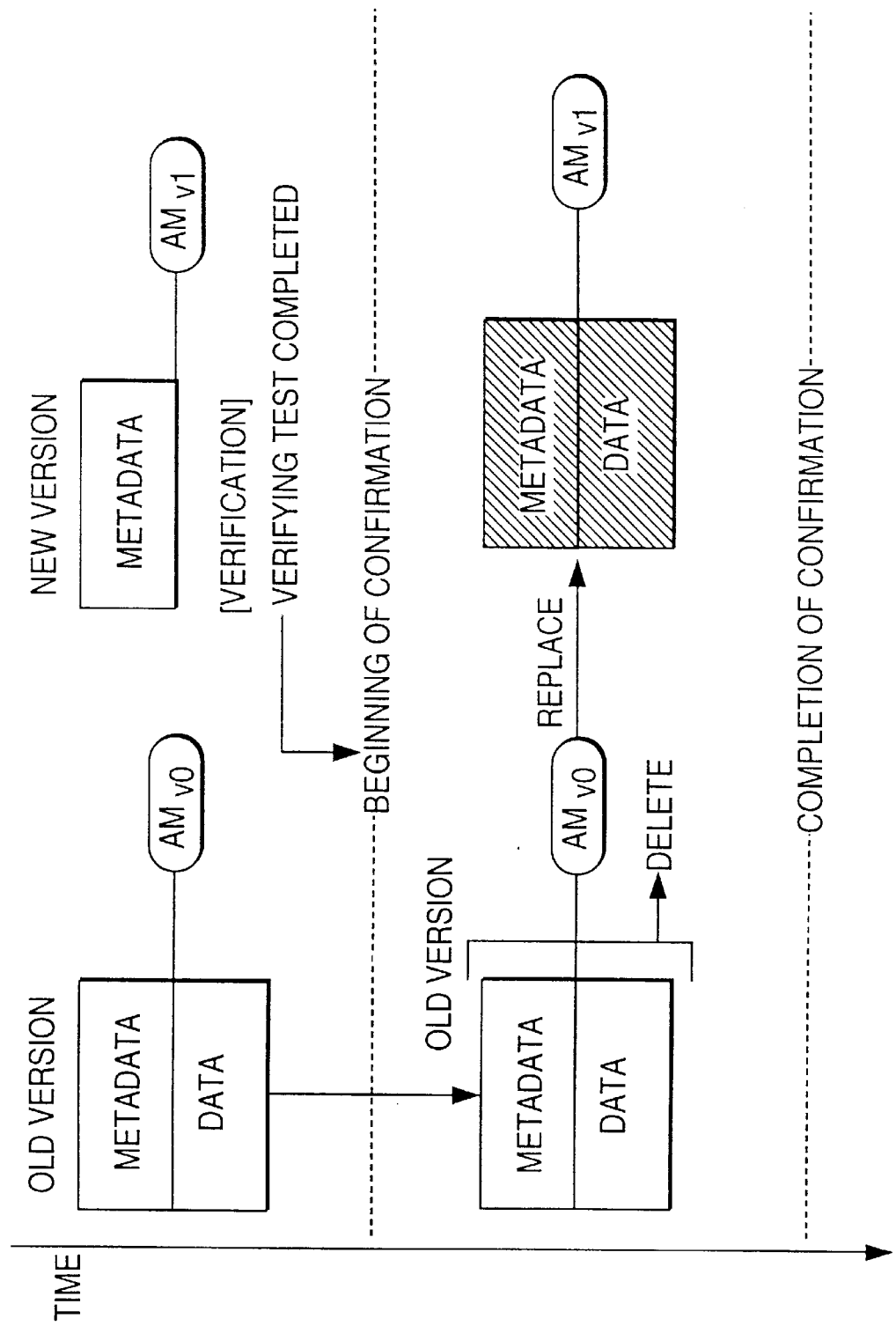
FIG. 22 shows an example of a confirming process using a single definition layer applied in an embodiment of the present invention.

If a new version is determined to be accepted by the verification, the confirmation phase is started. FIG. 22 shows an example of a confirming process using a single definition layer.

In the confirmation phase, a new version is replaced with an old version. The replacement depends on the verification result (1) or (2).

That is, if the result is (1) above (accepted as is), the confirmation phase is completed using a single definition layer. If the result is (2), the confirmation phase is completed using a plurality of definition layers.

If the confirmation phase is completed using a plurality of definition layers, it may result in lower level definition modification, or in modification of the interpretation of definition elements.

(1) When the confirmation phase results in lower level definition modification;

The procedure for the definition modification is performed according to the definition modification standard in a multi-abstraction configuration as described above by referring to FIG. 19. The definition modification may be a secondary lower level definition modification (for example, a modification of a record length in a generic composite structure). That is, the confirmation phase of a lower level definition modification must be completed as a condition of the completion of a higher level confirmation.

(2) When the interpretation of the relation among definition elements is to be modified;

A definition modification (for example, an addition of a column) is re-interpreted concerning the relation among associated definition elements, and a definition modification relating to the associated definition elements may not be performed. For example, an access to an added column is completely ignored.

In this case, the confirmation can be completed without a secondary lower level definition modification or completion of its conformation. As the interpretation of the database is modified, of course, all inquiries up to this point cannot be determined as valid.

Consistency check shown in steps 2–3 in FIG. 13 is explained in more in detail.

The explanation is given to show how to check the consistency of the definition elements to be applied in the application range.

To give a clearer explanation, a model is limited to be in the logical structure (relational model) and a storage structure (GCS and CS)(Other database models are set based on the same basic system, having different types and names of a definition).

The consistency check is made when an applying operation is performed by a consistency monitoring mechanism (82). The check range designation and the checking logic are described below.

1. The consistency check range

The consistency check range can be designated. Unless the integrity of definition elements of a database being defined is not recognized in the designated range, the process terminates abnormally. On the other hand, if the integrity of definition elements of a database being defined is recognized in the designated range, the process terminates normally.

Figure 23A:
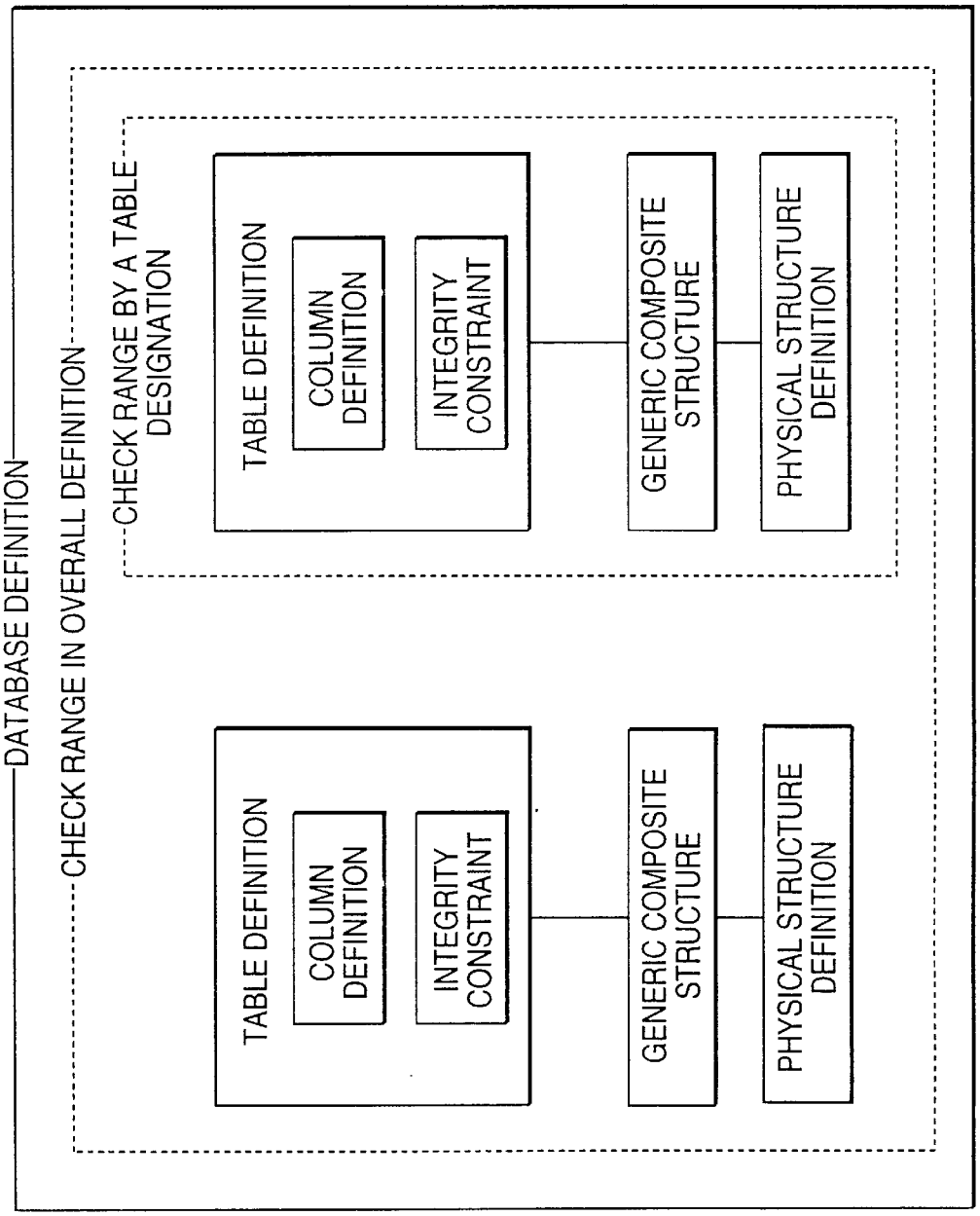
FIGS. 23A and 23B show block diagrams of a database definition.

For example, the consistency check range can be set as a) and b) below:

a) Designation by a table is shown in FIG. 23A.

A table name: The check range refers to the logical structure (column, integrity constraints, etc.) and the definition of the corresponding storage and physical structure (GCS and CS) to a designated table.

Figure 23B:
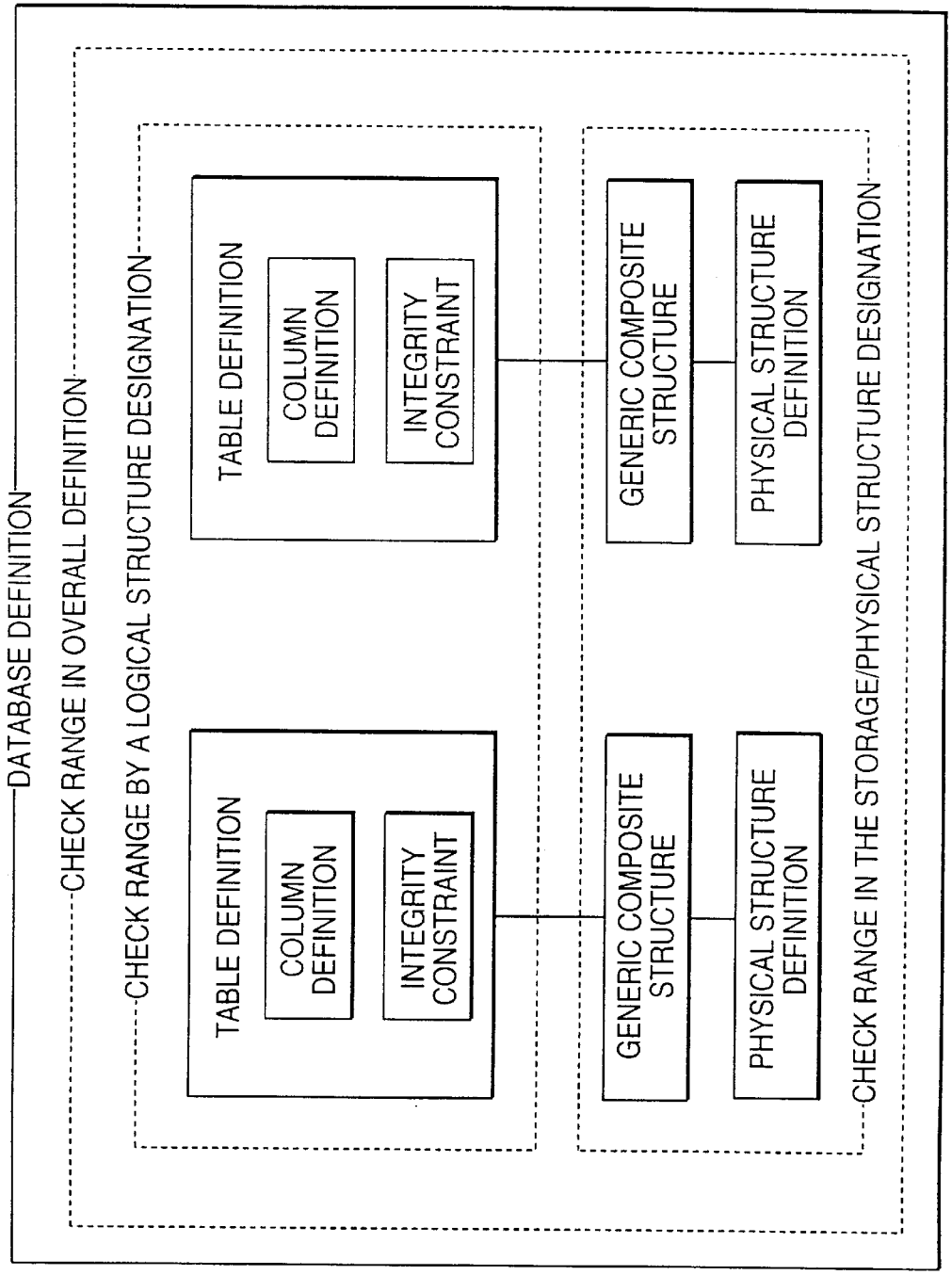

Overall designation: The check range refers to the logical structure (column, integrity constraints etc.) to all tables in a database being defined and the definition of the storage and physical structure (GCS and CS).

b) Designation by the logic, storage, and physical structures is shown in FIGS. 23B.

Likewise, the consistency check range can be designated respectively in the logical structure and the storage/physical structure.

Logical structure: The check range refers to the definition of the logical structure (columns, integrity constraints, etc.) to all tables in a database being defined.

Storage/physical structure: The check range refers to the definition of the storage/physical structure (GCS and CS) to all tables in a database being defined.

Overall designation: The check range refers to the designation of the logical structure (column, integrity constraints, etc.) to all tables in a database being defined and the storage/physical structure (GCS and CS).

2. Consistency check logic

The consistency check monitoring mechanism checks the consistency in the logical structure definition, generic composite structure, and physical structure definition within the range designated in 1, above, with the resource utilization state taken into account. The consistency check monitoring mechanism is used to ensure the consistency with necessary definitions established for the following optimizing operation and data accesses.

* Definition elements to be checked:

Logical structure . . . table, view, integrity constraints, and column

Storage structure . . . storage definition part of GCS and CS

Physical structure . . . space definition part of CS

* Relation to be checked (a) Upper/lower relation

"include" relation in the description

"semantic dependence" relation in the concept (conditions for existence, etc.)

"referencer/referencee" relation (b) Resource use relation

* Explanation of symbols (a) Definition elements and their upper/lower relation are shown by an arrow. The direction pointed by an arrow shows an upper element. Each block shows one definition element. Generally, a plurality of lower elements correspond to a single upper element.

Figure 24A:
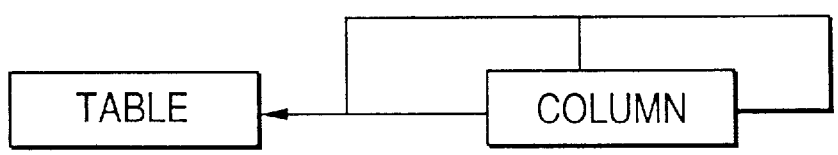
FIGS. 24A and 24B show an explanatory view of symbols.

For example, the relation between a table and a column is shown in FIG. 24A.

(b) Definition elements and their resource use relation are shown by an arrow. The direction pointed by an arrow shows a resource-providing element. Each block shows one definition element. A real line block indicates a resource-providing element, and a broken line block indicates a resource-provided element.

Figure 24B:
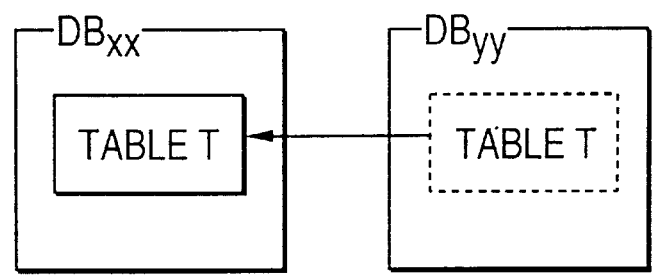

For example, a table definition T provided from a database DBxx to a database DByy is shown in FIG. 24B.

1) Consistency check (1)

The consistency of database definition of a new version is checked by a consistency monitoring mechanism based on the following logic:

a) Relation where one table is fixed (=relation without a view definition and referential constraint)

Figure 25A:
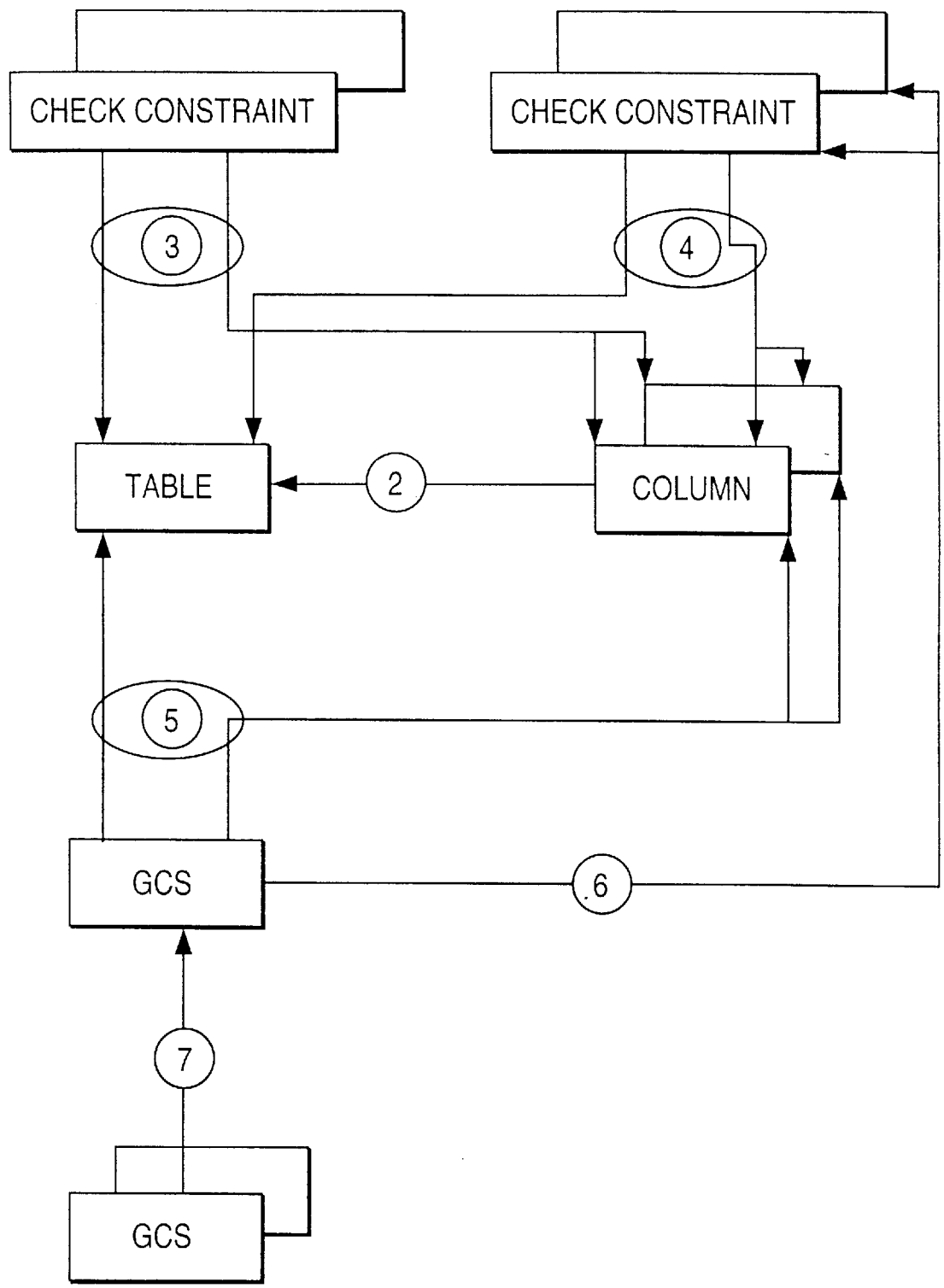
FIGS. 25A, 25B and 25C show views for explaining an example of a consistency check.

(1) The validity of arrows for the definition elements in FIG. 25A is checked. However, if either of the associated element is the resource-provided element, or both of them are the resource-provided elements from another database, the validity check is performed with the resource use relation taken into account.

(2) The opposite relation of the relation 1 to 6 is determined in the above illustrated relations. For example, the check of the opposite relation of 5 above is performed. by checking the definition of a GCS to a table. However, if either of the associated elements is the resource-provided element, or both of them are the resource-provided elements from another database, the validity check is performed with the resource use relation taken into account (refer to the consistency check (2)).

b) Relation of referential constraint (relation between two tabled)

Figure 25B:
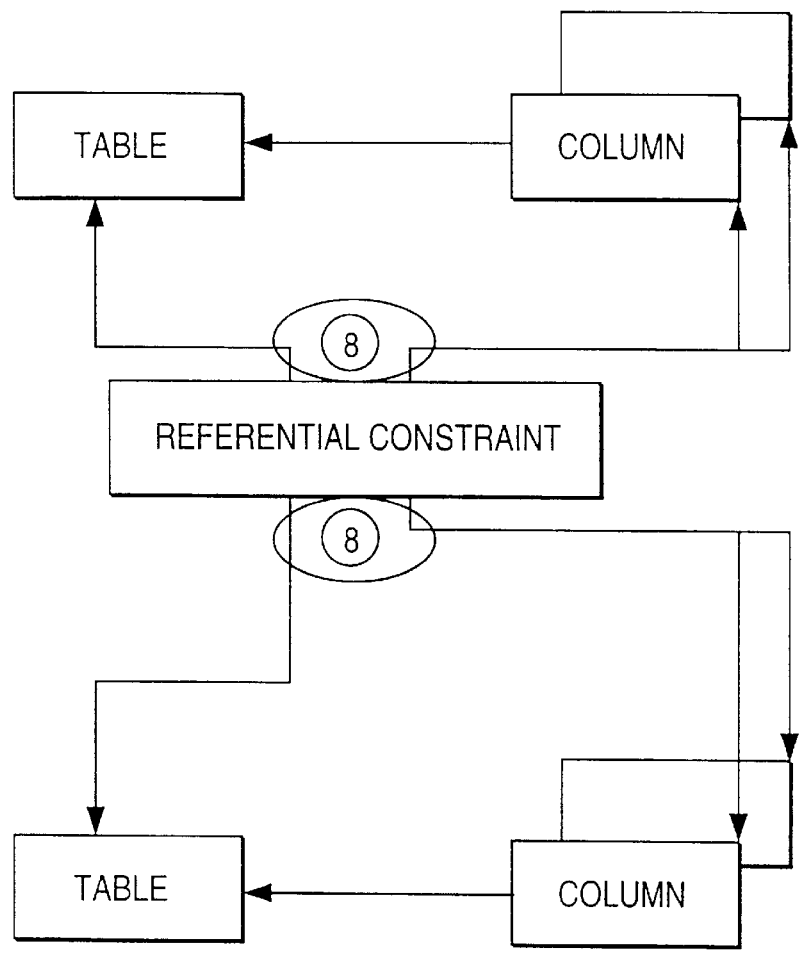

Among the definition elements in a new version database definition, the consistency of the definition elements associated with reference restriction is checked based on the following logic:

(1) The validity of 8 in the following definition elements shown in FIG. 25B is checked. However, if either of the associated elements of the relation 8, or both of them are provided from another database, the validity check is performed with the resource use relation taken into account.

c) Relation of view definition (relation among a plurality of tables)

Figure 25C:
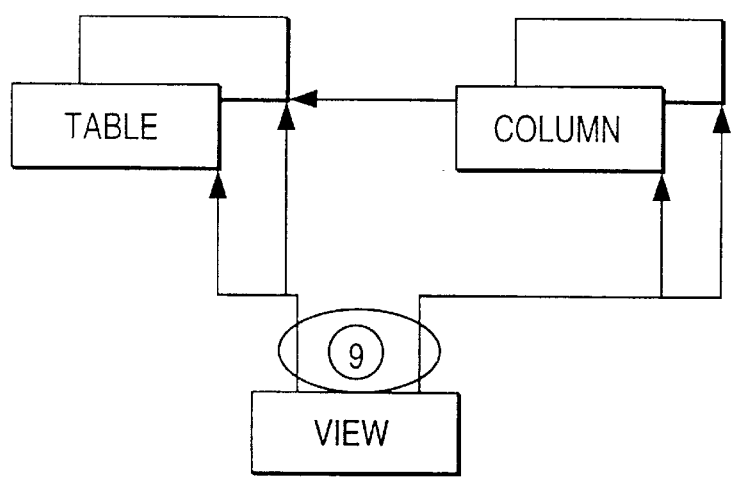

Among the definition elements in a new version, the consistency of the definition elements relating to a view is checked based on the following logic:

(1) The validity of 9 in the following definition elements shown in FIG. 25C is checked. However, if either of the associated elements of the relation 9 , or both of them are provided from another database, the validity check is performed with the resource use relation taken into account.

2) Consistency check (2) . . . Consistency check on the resource use relation

Figure 26A:
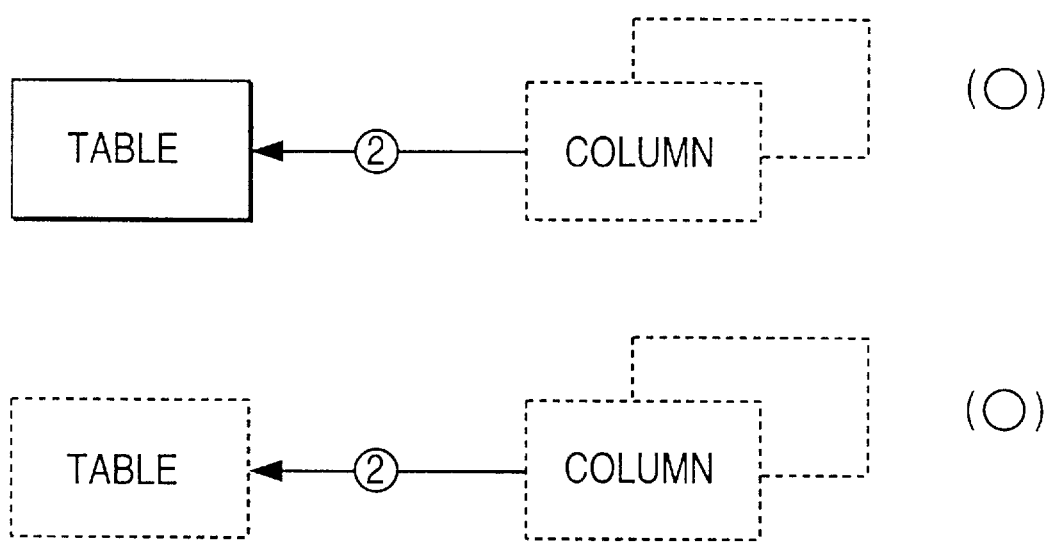
FIGS. 26A, 26B and 26C show views for explaining another example of a consistency check.
Figure 26B:
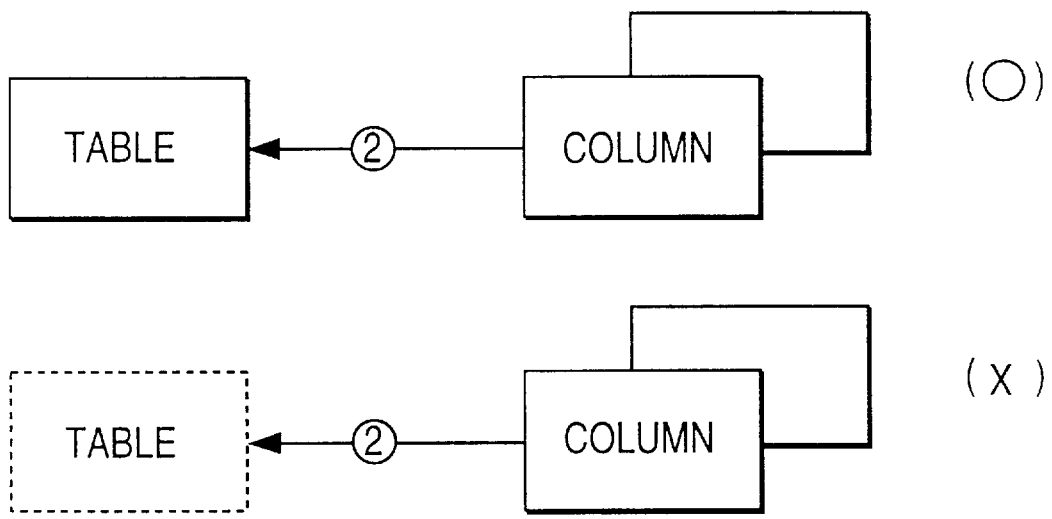

A consistency monitoring mechanism performs the following check relating to the resource use relation in new version database definition. This ensures that, among the definition elements having an entity (defined object), an upper definition element entity (defined object) exists in the environment of the same new version.

a) If a lower definition element is provided by an older version database definition, the entity of the upper definition element can exist in a new version database definition or can be provided by an old version database definition, as shown in FIG. 26A.

b) When an entity of the lower definition element exists in the new version database definition, the entity of the upper definition element also must exist in the database definition, as shown in FIG. 26B.

c) Generally, when an upper definition element has a plurality of lower definition elements, the resource use relation in each of lower definition elements can be different from one another as long as the restriction a)–b) is satisfied.

Figure 26C:
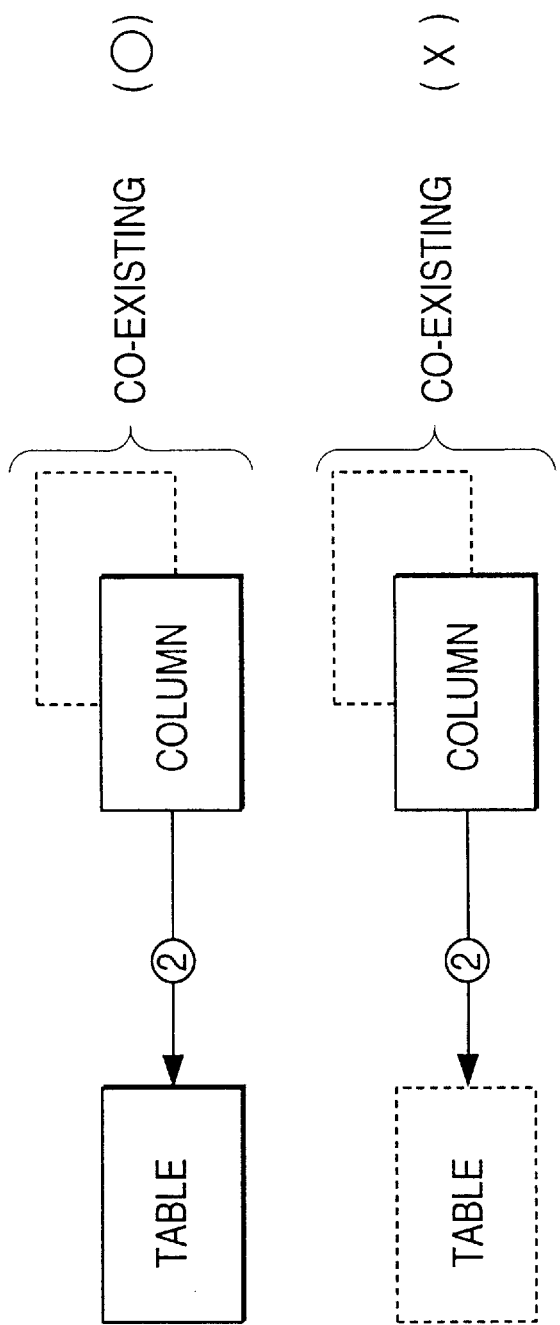

This means that all the lower definition elements of a definition element having an entity (defined object) in a database definition need not have an entity (defined object) in the database definition, thus ensuring the reduction of the redundancy database definition information, as shown in FIG. 26C.

Figure 27:
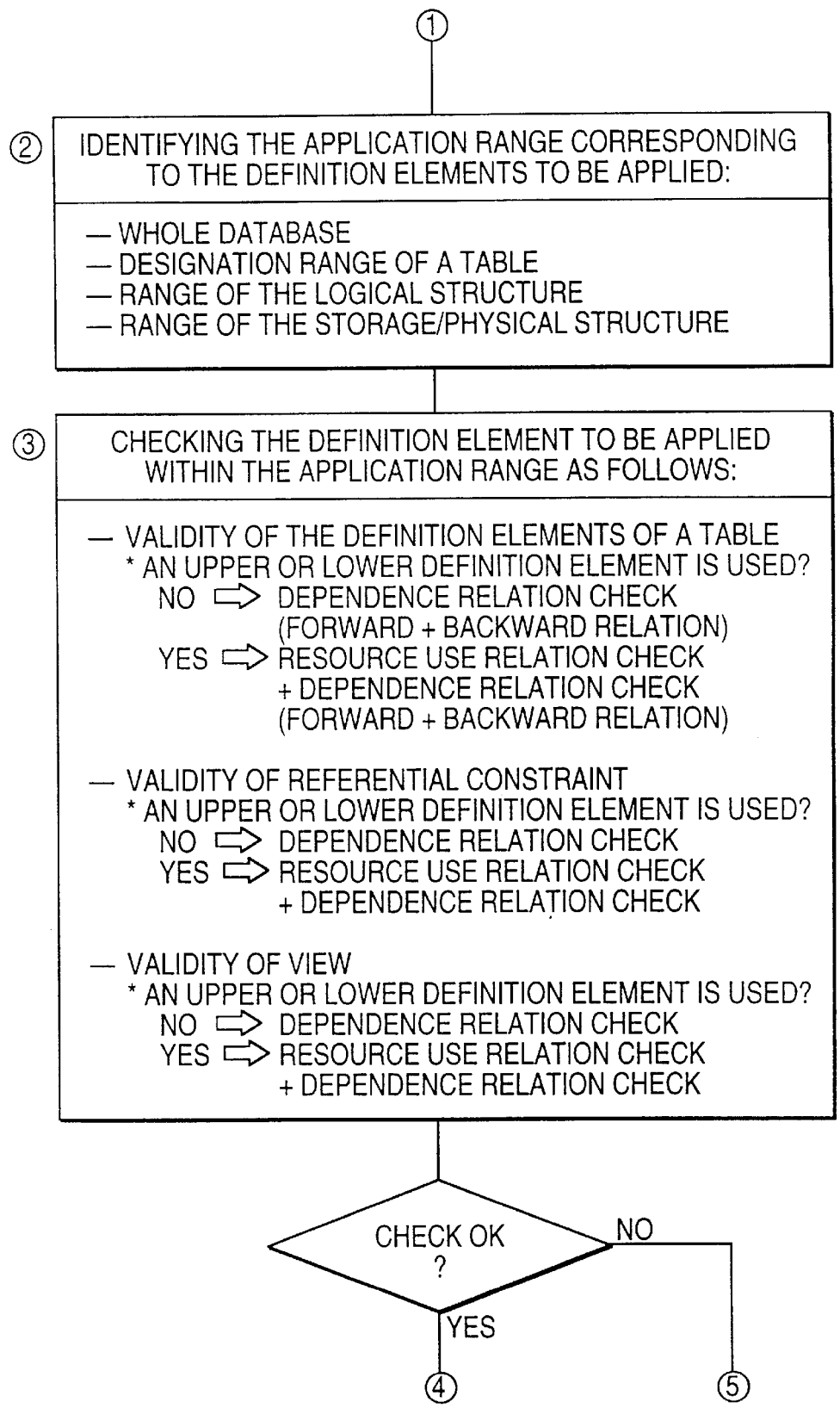
FIG. 27 shows a detailed flowchart corresponding to the flowchart shown in FIG. 13.

FIG. 27 shows a detailed flowchart corresponding to steps 2 and 3 in FIG. 13.

Step 2 identifies the application range corresponding to the definition elements to be applied. The application range comprises a whole database, a designation range of table, a range of the logical structure and a range of the storage/physical structure.

Step 3 checks the definition element to be applied within the application range as follows. As to validity of the definition elements of a table, it is determined whether an upper or lower definition element is used (i.e. borrowed). If NO, dependence relation check relating to a forward or backward relation is performed. If YES, resource use relation check and dependence relation check relating to a forward or backward relation is performed. As to a validity of the referential constraint, it is determined whether an upper or lower definition element is used (i.e. borrowed). If NO, a dependence relation check is performed. If YES, a resource use relation check and a dependence relation check are performed. As to a validity of a view, it is determined whether an upper or lower definition element is used. If NO, dependence relation check is performed. If YES, a resource use relation check and dependence relation check are performed.

As described above, the definition modification of a database applied in the present invention comprises an application phase, verification phase, and confirmation phase, each of these phases being formatted and standardized to establish a common model of definition modification. Thus, an ordinary user-specified procedure and restriction management can be adopted in a database management system. A progressive database re-organizing process in definition modification can be realized in a process model.

What is claimed is:

1. A derived database processing system in a database processing device comprising a plurality of databases independent of each other and storing groups of data in accordance with respective schema definitions defining data in corresponding ones of said plurality of databases, said schema definitions comprising definition frames of names of the data in each of the respective plurality of databases, and a plurality of users sharing the groups of data for a common purpose, said derived database processing system comprising:

a dictionary storing database logical definition information and database storage information stored in a secondary memory of said plurality of databases independent of each other;

derived database registering means for determining a new name for one of the groups of data in accordance with one of the definition frames, the one of the definition frames defining names acceptable in one of the schema definitions defining said groups of data in said plurality of databases independent of each other, and for registering to said dictionary, database selection information of a derived database corresponding to selected data of the groups of data stored in said plurality of databases independent of each other, having semantic consistency among tables stored in said plurality of databases, said tables relating to components of the data stored in said plurality of databases independent of each other, and alias specification information for specifying an alias for one of the names being used in said plurality of databases independent of each other;

dictionary information manipulating means for referring to said dictionary if a manipulation target is said derived database, then for selecting necessary components of the data stored in said plurality of databases independent of each other to define the selected data, and replacing an existing said alias with an original name; and database processing procedure generating means, in a binding process optimizing access routing in one of the plurality of databases independent of each other, for generating a database processing procedure using a partial collection of the components of the data in the groups of data stored in at least one of the plurality of databases independent of each other provided by said derived database registering means as registered in said dictionary, wherein the derived database processing system accesses the at least one of the plurality of databases independent of each other when accessing the selected data by associating the selected data with each other, thereby enabling an application program to access the at least one of the plurality cf databases independent of each other simultaneously.

2. A derived database processing system in a database processing device comprising a plurality of databases independent of each other and storing groups of data in accordance with definition frames and, a plurality of users sharing the groups of data for a common purpose, said derived database processing system comprising:

a plurality of element databases each having a dictionary storing information relating to a logical structure and a storage structure of the groups of data;

database deriving means for referring to said information stored in said dictionary in said plurality of element databases using an identifier of each of said element databases and a composite structure identifier corresponding to an area for storing said information, and for newly and virtually deriving a database including new logical structure associated with said storage structure; and dictionary information manipulating means for storing a corresponding relation between the composite structure identifier of said derived database and said respective element databases, wherein the derived database processing system accesses at least one of the plurality of databases independent of each other when accessing the groups of data by associating the groups of data with each other.

3. The derived database processing system according to claim 2, wherein said dictionary information manipulating means comprises:

derived database interpretation means for selecting, by retrieving, said corresponding relation stored in said dictionary information manipulating means, logical information manipulating means for selecting, by retrieving, said logical structure from said information stored in said dictionary, and storage information manipulating means for selecting, by retrieving, said storage structure from said information stored in said dictionary.

4. A derived database processing system accessing a plurality of databases independent of each other, said derived database processing system comprising:

a plurality of element databases each storing information relating to a logical structure and a storage structure of data in a dictionary;

database deriving means for referring to said information stored in said dictionary in said plurality of element databases using an identifier of each of said element databases and an identifier of a composite structure corresponding to an area for storing said information as a key, and for newly and virtually deriving a database including new logical structure associated with said storage structure; and dictionary information manipulating means for storing a corresponding relation between an identifier of the derived database and the identifier of each of said element databases in said dictionary, wherein the derived database processing system accesses at least one of the plurality of databases independent of each other when accessing the data by associating the data with each other.

5. The derived database processing system according to claim 4 wherein said dictionary information manipulating means comprises:

derived database interpreting means for selecting, by retrieving, said corresponding relation stored in said dictionary information manipulating means, logical information manipulating means for selecting, by retrieving, said logical structure from said information stored in said dictionary, and storage information manipulating means for selecting, by retrieving said storage structure from said information stored in said dictionary.

6. A database management system, managing a plurality of databases independent of each other and stored in database storage units, each database independent of each other comprising a plurality of data components, said database management system comprising:
- a dictionary storing database logical definition information of said plurality of databases, said database logical definition information comprising logical definition information of the data components and associated with corresponding database storage information stored in each of the database storage units; and
- derived database registering means for registering derived database definition information with said dictionary, said derived database definition information comprising a plurality of logical definition information of selected data components selected from said plurality of data components of said plurality of databases independent of each other, wherein the derived database processing system accesses at least one of the plurality of databases independent of each other when accessing the data components by associating the data components with each other, thereby enabling an application program to access the at least one of the plurality of databases independent of each other simultaneously.

7. A database management system according to claim 6, wherein
- said derived database definition information further comprises data relating an identifier of each data component of the data components with a corresponding alias.

* * * * *

UNITED STATES PATENT AND TRADEMARK OFFICE
CERTIFICATE OF CORRECTION

PATENT NO. : 5,873,088
DATED : February 16, 1999
INVENTOR(S) : Katsumi Hayashi, et al.

It is certified that error appears in the above-indentified patent and that said Letters Patent is hereby corrected as shown below:

On the title page item,

[75] Inventors:, line 4, "Takashi" should be --Takasho--;
                   line 6, "Suntou-gun" should be --Suntou--.

Col. 1, line 22, "language" should be --language,--.

Col. 2, lines 61-62, "numerical" should be -- numerical size)--.
Col. 8, line 30, "manufacture" should be --manufacturer--;
Col. 11, line 22, delete "25".
Col. 13, line 7, "SQI" should be --SQL--.
Col. 14, line 38, "EL" should be --a--.
Col. 18, line 19, "Consistency" should be --"Consistency"--.
Col. 22, line 23, delete "in".

Signed and Sealed this

Ninth Day of November, 1999

Attest:

Q. TODD DICKINSON

Attesting Officer

Acting Commissioner of Patents and Trademarks